United States Patent
Waas et al.

(10) Patent No.: US 11,269,824 B1
(45) Date of Patent: Mar. 8, 2022

(54) EMULATION OF DATABASE UPDATEABLE VIEWS FOR MIGRATION TO A DIFFERENT DATABASE

(71) Applicant: Datometry, Inc., San Francisco, CA (US)

(72) Inventors: Florian Michael Waas, San Francisco, CA (US); Dmitri Korablev, San Francisco, CA (US); Lyublena Rosenova Antova, Sunnyvale, CA (US); Mohamed Soliman, Foster City, CA (US); Michael Alexander Duller, San Francisco, CA (US)

(73) Assignee: DATOMETRY, INC., San Francisco, CA (US)

( * ) Notice: Subject to any disclaimer, the term of this patent is extended or adjusted under 35 U.S.C. 154(b) by 161 days.

(21) Appl. No.: 16/542,143

(22) Filed: Aug. 15, 2019

Related U.S. Application Data

(60) Provisional application No. 62/807,728, filed on Feb. 19, 2019, provisional application No. 62/782,713, filed on Dec. 20, 2018.

(51) Int. Cl.
*G06F 16/00* (2019.01)
*G06F 16/21* (2019.01)
(Continued)

(52) U.S. Cl.
CPC ........ *G06F 16/214* (2019.01); *G06F 16/2393* (2019.01); *G06F 16/2471* (2019.01); *G06F 16/282* (2019.01)

(58) Field of Classification Search
CPC ............... G06F 16/214; G06F 16/2393; G06F 16/2471; G06F 16/282
See application file for complete search history.

(56) References Cited

U.S. PATENT DOCUMENTS

| 5,970,490 A | 10/1999 | Morgenstern |
| 6,108,649 A | 8/2000 | Young et al. |

(Continued)

FOREIGN PATENT DOCUMENTS

| CN | 107122361 A | 9/2017 |
| WO | 2007121571 A1 | 11/2007 |

OTHER PUBLICATIONS

Aleyasen, A., et al., "High-Throughput Adaptive Data Virtualization via Context-Aware Query Routing," 2018 IEEE International Conference on Big Data, Dec. 10-13, 2018, 10 pages, Seattle, WA, USA.

(Continued)

*Primary Examiner* — Diedra McQuitery
(74) *Attorney, Agent, or Firm* — Adeli LLP

(57) ABSTRACT

For an updateable view that is defined for a first database, some embodiments provide an automated method for processing an update to data tuples in a second database, the update specified by reference to the updateable view. The method receives a first query from a client for modifying a particular data tuple presented in the updateable view. From a metadata storage, the method retrieves a definition of the updateable view, where the definition includes a reference to a first set of one or more objects associated with the particular data tuple in the first database. Based on the retrieved definition, the method generates a second query referencing a second set of one or more objects associated with the particular data tuple in the second database. The method executes the generated second query on the second database, to modify the particular data tuple in the second database.

20 Claims, 24 Drawing Sheets

(51) Int. Cl.
*G06F 16/2458* (2019.01)
*G06F 16/23* (2019.01)
*G06F 16/28* (2019.01)

(56) References Cited

U.S. PATENT DOCUMENTS

| | | |
|---|---|---|
| 6,704,747 B1 | 3/2004 | Fong |
| 6,889,227 B1 | 5/2005 | Hamilton |
| 7,123,608 B1 | 10/2006 | Scott et al. |
| 7,146,376 B2 | 12/2006 | Dettinger et al. |
| 7,203,678 B1 | 4/2007 | Petropoulos et al. |
| 7,263,590 B1 | 8/2007 | Todd et al. |
| 7,346,635 B2 | 3/2008 | Whitten et al. |
| 7,359,916 B2 | 4/2008 | Werner |
| 7,480,661 B2 | 1/2009 | Seefeldt et al. |
| 7,620,665 B1 | 11/2009 | George et al. |
| 7,664,795 B2 | 2/2010 | Balin et al. |
| 7,693,913 B2 | 4/2010 | Goto |
| 7,805,583 B1 | 9/2010 | Todd et al. |
| 7,877,397 B2 | 1/2011 | Nagarajan et al. |
| 7,885,968 B1 | 2/2011 | Hamamatsu et al. |
| 8,015,233 B2 | 9/2011 | Li et al. |
| 8,275,810 B2 | 9/2012 | Barton |
| 8,429,601 B2 | 4/2013 | Andersen |
| 8,447,774 B1 | 5/2013 | Robie et al. |
| 8,533,177 B2 | 9/2013 | Huck et al. |
| 8,612,468 B2 | 12/2013 | Schloming |
| 8,631,034 B1 | 1/2014 | Peloski |
| 8,793,797 B2 | 7/2014 | Meenakshisundaram |
| 8,874,609 B1 | 10/2014 | Singh et al. |
| 8,898,126 B1 | 11/2014 | Dai |
| 8,918,416 B1 | 12/2014 | Gross et al. |
| 8,943,181 B2 | 1/2015 | Kasten et al. |
| 8,972,433 B2 | 3/2015 | McLean et al. |
| 8,996,555 B2 | 3/2015 | Kuchmann-Beauger et al. |
| 9,075,811 B2 | 7/2015 | Nayyar et al. |
| 9,158,827 B1 | 10/2015 | Vu et al. |
| 9,201,606 B1 | 12/2015 | Taylor et al. |
| 9,208,032 B1 | 12/2015 | McAlister et al. |
| 9,305,070 B2 | 4/2016 | Zhu et al. |
| 9,582,539 B1 | 2/2017 | Cole et al. |
| 9,639,572 B2 | 5/2017 | Hutzel et al. |
| 9,665,619 B1 | 5/2017 | Cole et al. |
| 9,697,484 B1 | 7/2017 | Mohen et al. |
| 9,785,645 B1 | 10/2017 | Chen et al. |
| 9,811,527 B1 | 11/2017 | Esposito et al. |
| 10,108,914 B2 | 10/2018 | Mohen et al. |
| 10,120,920 B2 | 11/2018 | Alva et al. |
| 10,162,729 B1 | 12/2018 | Snyder et al. |
| 10,241,960 B2 | 3/2019 | Kent, IV et al. |
| 10,255,336 B2 | 4/2019 | Waas et al. |
| 10,261,956 B2 | 4/2019 | Jugel et al. |
| 10,445,334 B1 | 10/2019 | Xiao et al. |
| 10,585,887 B2 | 3/2020 | Tran et al. |
| 10,594,779 B2 | 3/2020 | Waas et al. |
| 10,599,664 B2 | 3/2020 | Agrawal et al. |
| 10,614,048 B2 | 4/2020 | Fuglsang et al. |
| 10,628,438 B2 | 4/2020 | Waas et al. |
| 10,649,965 B2 | 5/2020 | Barbas et al. |
| 10,649,989 B2 | 5/2020 | Lereya et al. |
| 10,762,100 B2 | 9/2020 | Waas et al. |
| 10,762,435 B2 | 9/2020 | Yang et al. |
| 10,769,200 B1 | 9/2020 | Lin |
| 10,783,124 B2 | 9/2020 | Barbas et al. |
| 10,824,641 B1 | 11/2020 | Plenderleith |
| 10,846,284 B1 | 11/2020 | Park et al. |
| 11,016,954 B1 | 5/2021 | Babocichin et al. |
| 2001/0034733 A1 | 10/2001 | Prompt et al. |
| 2002/0087587 A1 | 7/2002 | Vos et al. |
| 2002/0133504 A1 | 9/2002 | Vlahos et al. |
| 2002/0161907 A1 | 10/2002 | Moon |
| 2003/0126156 A1 | 7/2003 | Stoltenberg et al. |
| 2003/0184793 A1 | 10/2003 | Pineau |
| 2004/0122953 A1 | 6/2004 | Kalmuk et al. |
| 2004/0139061 A1 | 7/2004 | Colossi et al. |
| 2004/0215629 A1 | 10/2004 | Dettinger et al. |
| 2005/0038781 A1 | 2/2005 | Ferrari et al. |
| 2005/0080914 A1 | 4/2005 | Lerner et al. |
| 2005/0234889 A1 | 10/2005 | Fox et al. |
| 2006/0026179 A1 | 2/2006 | Brown et al. |
| 2006/0136448 A1 | 6/2006 | Cialini et al. |
| 2006/0167896 A1 | 7/2006 | Kapur et al. |
| 2006/0242297 A1 | 10/2006 | Aronoff et al. |
| 2007/0027905 A1 | 2/2007 | Warren et al. |
| 2007/0061266 A1 | 3/2007 | Moore et al. |
| 2007/0136311 A1 | 6/2007 | Kasten et al. |
| 2007/0219959 A1 | 9/2007 | Kanemasa |
| 2007/0239774 A1 | 10/2007 | Bodily et al. |
| 2007/0283144 A1 | 12/2007 | Kramer et al. |
| 2008/0281784 A1 | 11/2008 | Zane et al. |
| 2009/0024622 A1 | 1/2009 | Chkodrov et al. |
| 2009/0059785 A1 | 3/2009 | Jogalekar et al. |
| 2009/0132503 A1 | 5/2009 | Sun et al. |
| 2009/0150367 A1 | 6/2009 | Melnik et al. |
| 2009/0240711 A1 | 9/2009 | Levin |
| 2009/0319498 A1 | 12/2009 | Zabokritski et al. |
| 2010/0023481 A1* | 1/2010 | McGoveran .......... G06F 16/284 707/E17.005 |
| 2010/0082646 A1* | 4/2010 | Meek .................... G06F 16/252 707/752 |
| 2010/0094838 A1 | 4/2010 | Kozak |
| 2010/0169377 A1 | 7/2010 | Galeazzi et al. |
| 2010/0169381 A1 | 7/2010 | Faunce et al. |
| 2011/0010379 A1 | 1/2011 | Gilderman et al. |
| 2011/0055231 A1 | 3/2011 | Huck et al. |
| 2011/0154461 A1 | 6/2011 | Anderson et al. |
| 2011/0191343 A1 | 8/2011 | Heaton et al. |
| 2011/0276623 A1 | 11/2011 | Girbal |
| 2011/0320444 A1 | 12/2011 | Yehaskel et al. |
| 2012/0005148 A1 | 1/2012 | Horvitz et al. |
| 2012/0036146 A1 | 2/2012 | Annapragada |
| 2012/0102022 A1 | 4/2012 | Miranker et al. |
| 2012/0131567 A1 | 5/2012 | Barros et al. |
| 2012/0158650 A1 | 6/2012 | Andre et al. |
| 2012/0179677 A1 | 7/2012 | Roselli et al. |
| 2012/0221817 A1 | 8/2012 | Yueh |
| 2012/0296942 A1* | 11/2012 | Arora .................... G06F 16/832 707/807 |
| 2012/0303913 A1 | 11/2012 | Kathmann et al. |
| 2012/0304179 A1 | 11/2012 | Devarakonda et al. |
| 2013/0066948 A1 | 3/2013 | Colrain et al. |
| 2013/0085989 A1 | 4/2013 | Nayyar et al. |
| 2013/0163737 A1 | 6/2013 | Dement et al. |
| 2013/0179476 A1 | 7/2013 | Saam et al. |
| 2013/0262425 A1 | 10/2013 | Shamlin et al. |
| 2013/0311729 A1 | 11/2013 | Navarro et al. |
| 2013/0325927 A1 | 12/2013 | Corbett et al. |
| 2014/0095534 A1 | 4/2014 | Aingaran et al. |
| 2014/0136516 A1 | 5/2014 | Clifford et al. |
| 2014/0143011 A1 | 5/2014 | Mudugu et al. |
| 2014/0195514 A1 | 7/2014 | Stein |
| 2014/0244610 A1 | 8/2014 | Raman et al. |
| 2014/0280286 A1 | 9/2014 | Ganti et al. |
| 2014/0325096 A1 | 10/2014 | Jung et al. |
| 2015/0019488 A1 | 1/2015 | Higginson et al. |
| 2015/0095381 A1 | 4/2015 | Chen et al. |
| 2015/0172206 A1 | 6/2015 | Anderson et al. |
| 2015/0248404 A1 | 9/2015 | Pazdziora et al. |
| 2015/0269223 A1 | 9/2015 | Miranker et al. |
| 2015/0310057 A1 | 10/2015 | Fu et al. |
| 2015/0339361 A1 | 11/2015 | Kumar et al. |
| 2015/0347585 A1 | 12/2015 | Klotz |
| 2015/0363396 A1 | 12/2015 | Sengupta et al. |
| 2016/0127325 A1 | 5/2016 | Odenheimer et al. |
| 2016/0261576 A1 | 9/2016 | Nivala et al. |
| 2016/0292164 A1 | 10/2016 | Kedia et al. |
| 2016/0308941 A1 | 10/2016 | Cooley |
| 2016/0321097 A1 | 11/2016 | Zhu et al. |
| 2016/0328442 A1 | 11/2016 | Waas et al. |
| 2016/0335361 A1 | 11/2016 | Teodorescu et al. |
| 2017/0011104 A1 | 1/2017 | Hyde et al. |
| 2017/0017685 A1 | 1/2017 | Das et al. |
| 2017/0034095 A1 | 2/2017 | Kamalakantha et al. |
| 2017/0063936 A1 | 3/2017 | Waas et al. |

(56) References Cited

U.S. PATENT DOCUMENTS

| | | |
|---|---|---|
| 2017/0116207 A1 | 4/2017 | Lee et al. |
| 2017/0116249 A1 | 4/2017 | Ravipati et al. |
| 2017/0116260 A1 | 4/2017 | Chattopadhyay |
| 2017/0116274 A1 | 4/2017 | Weissman et al. |
| 2017/0116298 A1 | 4/2017 | Ravipati et al. |
| 2017/0124146 A1 | 5/2017 | Lereya et al. |
| 2017/0147656 A1 | 5/2017 | Choudhary et al. |
| 2017/0177650 A1 | 6/2017 | Devine et al. |
| 2017/0235790 A1 | 8/2017 | Bruso et al. |
| 2017/0249353 A1 | 8/2017 | Gulik et al. |
| 2017/0262777 A1 | 9/2017 | Mohen et al. |
| 2018/0081946 A1 | 3/2018 | Bondalapati et al. |
| 2018/0121433 A1 | 5/2018 | Nevrekar et al. |
| 2018/0144001 A1 | 5/2018 | Lai et al. |
| 2018/0150361 A1 | 5/2018 | Khandelwal |
| 2018/0173775 A1 | 6/2018 | Li et al. |
| 2018/0218030 A1 | 8/2018 | Wong et al. |
| 2018/0234327 A1 | 8/2018 | Kono |
| 2018/0246886 A1 | 8/2018 | Dragomirescu et al. |
| 2018/0285475 A1* | 10/2018 | Grover .................. G06F 16/284 |
| 2018/0292995 A1 | 10/2018 | Tai et al. |
| 2018/0329916 A1 | 11/2018 | Waas et al. |
| 2018/0357291 A1 | 12/2018 | Choi et al. |
| 2019/0065536 A1 | 2/2019 | Becker et al. |
| 2019/0095241 A1 | 3/2019 | Ago et al. |
| 2019/0138402 A1 | 5/2019 | Bikumala et al. |
| 2019/0155805 A1 | 5/2019 | Kent, IV et al. |
| 2019/0294763 A1 | 9/2019 | Coatrieux et al. |
| 2019/0303379 A1 | 10/2019 | Waas et al. |
| 2019/0311057 A1 | 10/2019 | Sung et al. |
| 2019/0327154 A1 | 10/2019 | Sahoo et al. |
| 2019/0392067 A1 | 12/2019 | Sonawane et al. |
| 2020/0104375 A1 | 4/2020 | Earnesty, Jr. et al. |
| 2020/0104376 A1 | 4/2020 | Earnesty, Jr. et al. |
| 2020/0104377 A1 | 4/2020 | Earnesty, Jr. et al. |
| 2020/0125582 A1 | 4/2020 | O'Shaughnessy |
| 2020/0167323 A1 | 5/2020 | Swamy et al. |
| 2020/0169600 A1 | 5/2020 | Waas et al. |
| 2020/0183929 A1 | 6/2020 | Lee et al. |
| 2020/0201860 A1 | 6/2020 | Vogelsgesang et al. |
| 2020/0250179 A1 | 8/2020 | Agrawal et al. |
| 2020/0278966 A1 | 9/2020 | Al-Omari et al. |
| 2021/0034636 A1 | 2/2021 | Waas et al. |

OTHER PUBLICATIONS

Antova, Lyublena, et al., "Datometry Hyper-Q: Bridging the Gap Between Real-Time and Historical Analytics," SIGMOD'16, Jun. 26-Jul. 1, 2016, 12 pages, ACM, San Francisco, CA, USA.

Antova, Lyublena, et al., "Rapid Adoption of Cloud Data Warehouse Technology Using Datometry Hyper-Q," Month Unknown, 2017, 12 pages, Datometry, Inc.

Author Unknown, "AWS Database Migration Service," Month Unknown, 2017, 8 pages, Amazon Web Services, Inc., retrieved from https://aws.amazon.com/dms/.

Author Unknown, "DBBest Technologies," Month Unknown, 2017, 3 pages, DB Best Technologies, LLC, retrieved from https://www.dbbest.com/.

Author Unknown, "Ispirer," Month Unknown, 2017, 5 pages, Ispirer Systems, LLC, retrieved from https://www.ispirer.com/.

Author Unknown, "Linked Servers (Database Engine)," Oct. 14, 2019, 5 pages, Microsoft, retrieved from https://docs.microsoft.com/en-us/sql/relational-databases/linked-servers/linked-servers-database-engine?view=sql-server-ver15.

Author Unknown, "Replatforming Custom Business Intelligence," Case Study, Month Unknown 2018, 2 pages, Datometry, Inc.

Author Unknown, "Teradata Data Warehouse—End of Useful Life," Case Study, Month Unknown 2018, 2 pages, Datometry, Inc., retrieved from https://datometry.com/resources/case-studies/replatform-teradata-end-of-useful-life-replatforming-to-cloud/.

Gupta, Anurag, et al., "Amazon Redshift and the Case for Simpler Data Warehouses," SIGMOD'15, May 31, 2015-Jun. 4, 2015, 7 pages, ACM, Melbourne, Victoria, Australia.

Non-Published Commonly Owned U.S. Appl. No. 16/542,133, filed Aug. 15, 2019, 70 pages, Datometry, Inc.

Non-Published Commonly Owned U.S. Appl. No. 16/542,140, filed Aug. 15, 2019, 70 pages, Datometry, Inc.

Non-Published Commonly Owned U.S. Appl. No. 16/542,145, filed Aug. 15, 2019, 71 pages, Datometry, Inc.

Non-Published Commonly Owned U.S. Appl. No. 16/542,146, filed Aug. 15, 2019, 71 pages, Datometry, Inc.

Non-Published Commonly Owned U.S. Appl. No. 16/542,148, filed Aug. 15, 2019, 71 pages, Datometry, Inc.

Simitsis, Alkis, et al., "Optimizing Analytic Data Flows for Multiple Execution Engines," SIGMOD '12, May 20-24, 2012, 12 pages, ACM, Scottsdale, Arizona, USA.

Soliman, Mohamed A., et al., "Orca: A Modular Query Optimizer Architecture for Big Data," SIGMOD'14, Jun. 22-27, 2014, 12 pages, ACM, Snowbird, Utah, USA.

Author Unknown, "46.2. Message Flow," PostgreSQL 9.2.24 Documentation, Chapter 46: Frontend/Backend Protocol, Nov. 9, 2017, 8 pages, The PostgreSQL Global Development Group, retrieved from https://www.postgresql.org/docs/92/static/protocol-flow.html.

Author Unknown, "46.5. Message Formats," PostgreSQL 9.2.24 Documentation, Chapter 46: Frontend/Backend Protocol, Nov. 9, 2017, 11 pages, The PostgreSQL Global Development Group, retrieved from https://www.postgresql.org/docs/9.2/static/protocol-message-formats.html.

Author Unknown, "Greenplum Database: Critical Mass Innovation," Architecture White Paper, Aug. 2010, 17 pages, EMC Corporation, San Mateo, CA, USA.

Author Unknown, "Informatica Data Services," Data Sheet, Month Unknown, 2015, 4 pages, Informatica LLC, Redwood City, CA, USA.

Author Unknown, "Informatica PowerCenter Data Virtualization Edition," Data Sheet, Month Unknown, 2013, 8 pages, Informatica LLC, Redwood City, CA, USA.

Author Unknown, "Introduction to InfoSphere Federation Server," IBM InfoSphere Foundation Tools IBM InfoSphere Information Server, Version 8.7.0, Oct. 1, 2011, 4 pages, IBM.

Zhang, Mingyi, et al., "Workload Management in Database Management Systems: A Taxonomy," IEEE Transactions on Knowledge and Data Engineering—Manuscript, Month Unknown 2017, 18 pages, IEEE.

Author Unknown, "MemSQL Overview," White Paper, Aug. 2018, 4 pages, MemSQL Inc.

Author Unknown, "Microsoft Analytics Platform System," Jan. 2016, 2 pages, Microsoft Corporation.

Author Unknown, "Reference/ipcprotocol," Feb. 13, 2017, 8 pages, retrieved from http://code.kx.com/wiki/Reference/ipcprotocol.

Author Unknown, "Teradata Vantage," Data Sheet, Month Unknown 2018, 3 pages, Teradata Corporation, San Diego, CA, USA.

Author Unknown, "The 21st Century Time-series Database," White Paper, Jul. 2016, 10 pages, Kx Systems, Inc.

Author Unknown, "The Denodo Platform 7.0," White Paper, Month Unknown, 2018, 44 pages, Denodo Technologies.

Bear, Chuck, et al., "The Vertica Database: SQL RDBMS For Managing Big Data," MBDS'12, Sep. 21, 2012, 2 pages, ACM, San Jose, CA, USA.

Bornea, Mihaela A., et al., "One-Copy Serializability with Snapshot Isolation Under the Hood," 2011 IEEE 27th International Conference on Data Engineering, Apr. 11-16, 2011, 12 pages, IEEE, Hannover, Germany.

Cecchet, Emmanuel, et al., "Middleware-based Database Replication: The Gaps Between Theory and Practice," SIGMOD'08, Jun. 9-12, 2008, 14 pages, Vancouver, Canada.

Chang, Lei, et al., "HAWQ: A Massively Parallel Processing SQL Engine in Hadoop," SIGMOD'14, Jun. 22-27, 2014, 12 pages, ACM, Snowbird, Utah, USA.

Elnikety, Sameh, et al., "Tashkent: Uniting Durability with Transaction Ordering for High-Performance Scalable Database Replication," EuroSys'06, Apr. 18-21, 2006, 14 pages, ACM, Leuven, Belgium.

Flores, Carlos, et al., "SeDiM: A Middleware Framework for Interoperable Service Discovery in Heterogeneous Networks," ACM

(56) References Cited

OTHER PUBLICATIONS

Transactions on Autonomous and Adaptive Systems, Feb. 2011, 8 pages, vol. 6, No. 1, Article 6, ACM, New York, NY, USA.

Garland, Simon, "Big Data Analytics: Tackling the Historical Data Challenge," CIOReview, Month Unknown 2014, 3 bages, retrieved from https://data-analytics.cioreview.com/cxoinsight/big-data-analytics-tackling-the-historical-data-challenge-nid-4298-cid-156.html.

Gog, Ionel, et al. "Musketeer: all for one, one for all in data processing systems," EuroSys'15, Apr. 21-24, 2015, 16 sages, ACM, Bordeaux, France.

Gorman, Ciarán, "Columnar Database and Query Optimization," Technical Whitepaper, Mar. 2013, 26 pages, Kx Systems, Inc.

Gray, Jim, et al., "The Dangers of Replication and a Solution," Technical Report—MSR-TR-96-17, SIGMOD '96, June 1-6, 1996, 12 pages, ACM, Montreal, Quebec, Canada.

Hanna, James, "Multi-Partitioned kdb+ Databases: An Equity Options Case Study," Technical Whitepaper, Oct. 2012, 13 pages, Kx Systems, Inc.

Heimbigner, Dennis, et al., "A Federated Architecture for Information Management," ACM Transactions on Information Systems (TOIS), Jul. 1985, 26 pages, vol. 3, Issue 3, New York, Ny, USA.

Hohenstein, Uwe, et al., "Improving Connection Pooling Persistence Systems," 2009 First International Conference on Intensive Applications and Services, Apr. 20-25, 2009, 7 pages, IEEE, Valencia, Spain.

Hwang, San-Yih, "The MYRIAD Federated Database Prototype," SIGMOD '94 Proceedings of the 1994 ACM SIGMOD International Conference on Management of Data, May 24-27, 1994, 1 page, ACM, New York, New York, USA.

Kache, Holger, et al., "POP/FED: Progressive Query Optimization for Federated Queries in DB2," VLDB '06, Sep. 12-15, 2006, 4 pages, ACM, Seoul, Korea.

Lin, Yi, et al., "Middleware based Data Replication Providing Snapshot Isolation," SIGMOD 2005, Jun. 14-16, 2005, 12 pages, ACM, Baltimore, Maryland, USA.

Non-Published Commonly Owned U.S. Appl. No. 16/270,575, filed Feb. 7, 2019, 36 pages, Datometry, Inc.

Non-Published Commonly Owned U.S. Appl. No. 16/599,049, filed Oct. 10, 2019, 54 pages, Datometry, Inc.

Non-Published Commonly Owned U.S. Appl. No. 16/599,055, filed Oct. 10, 2019, 53 pages, Datometry, Inc.

Mon-Published Commonly Owned U.S. Appl. No. 16/599,057, filed Oct. 10, 2019, 54 pages, Datometry, Inc.

Non-Published Commonly Owned U.S. Appl. No. 16/599,061, filed Oct. 10, 2019, 53 pages, Datometry, Inc.

Non-Published Commonly Owned U.S. Appl. No. 16/599,064, filed Oct. 10, 2019, 53 pages, Datometry, Inc.

Non-Published Commonly Owned U.S. Appl. No. 16/599,066, filed Oct. 10, 2019, 53 pages, Datometry, Inc.

Non-Published Commonly Owned U.S. Appl. No. 16/599,071, filed Oct. 10, 2019, 53 pages, Datometry, Inc.

Non-Published Commonly Owned U.S. Appl. No. 16/684,785, filed Nov. 15, 2019, 54 pages, Datometry, Inc.

Non-Published Commonly Owned U.S. Appl. No. 16/684,803, filed Nov. 15, 2019, 54 pages, Datometry, Inc.

Non-Published Commonly Owned U.S. Appl. No. 16/684,847, filed Nov. 15, 2019, 54 pages, Datometry, Inc.

Owrang O., M. Mehdi, et al., "A Parallel Database Machine for Query Translation in a Distributed Database System," SAC '86: Proceedings of the 1986 Workshop on Applied Computing, Oct. 1986, 6 pages.

Plattner, Christian, et al., "Ganymed: Scalable Replication for Transactional Web Applications," Middleware '04, Oct. 18-22, 2004, 20 pages, Toronto, Canada.

Pullokkaran, Laljo John, "Analysis of Data Virtualization & Enterprise Data Standardization in Business Intelligence," Working Paper CISL# Oct. 2013, May 2013, 60 pages, Massachusetts Institute of Technology, Cambridge, Massachusetts, USA.

Schlamb, Kelly, "dashDB: Self-service data warehousing in the cloud at any scale," DB2 Tech Talk, Jun. 25, 2015, 55 pages, IBM Corporation.

Wang, Jinfu, et al., "Anomaly Detection in the Case of Message Oriented Middleware," MidSec '08, Dec. 1-5, 2008, 3 pages, ACM, Leuven, Belgium.

Whitney, Arthur, et al., "Lots o' Ticks: real-time high performance time series queries on billions of trades and quotes," ACM SIGMOD 2001, May 21-24, 2001, 1 page, ACM, Santa Barbara, California, USA.

\* cited by examiner

| SCHEMA | TABLE | COLUMN | PROPERTY | VALUE | OWNER | HASH |
|---|---|---|---|---|---|---|
| "DB" | "SALES" | "TimeOfSale" | "default_value" | "current_timestamp" | jkirk | 0x123 |
| "DB" | "USERS" | "password" | "case_sens" | "true" | ehalley | 0x139 |
| "DB" | "PAYROLL" | "payroll21" | "period" | "split([start, end], str, " ") interval = format(end - start, "date")" | jkirk | 0x156 |
| "DB" | "MY_PROCS" | null | "storedproc_def" | x := 10<br>LOOP while x > 0<br>DELETE from T where A = x<br>x := SELECT count(*) from T<br>END LOOP | lmccoy | 0x222 |
| "DB" | "MY_VIEWS" | null | "view_def" | "CREATE view V as<br>SELECT A as C from T" | lmccoy | 0x789 |
| "DB" | "TD_CATALOG" | null | "DBC.Tables" | dbc.tables -><br>SELECT ... from<br>information_schema.tables<br>union all<br>SELECT ... from<br>information_schema.routines | dwho | 0x444 |

*Figure 11*

UPDATE EMPL_V
   set Lastname = 'Smith'
   where FirstName = 'Peter'

1705

CREATE EMPL_V as
   SEL * from EMPL
   where Dept = 'Sales'
   with CHECK_OPTION

```
dbc.tables ->
          SELECT
          cast(T.table_schema (not cs) as , TypeNameCol,
              ) as DataBaseName,
          cast(T.table_name (not cs) as , TypeNameCol,
              ) as TableName,
          cast(NULL as smallint) as Version,
          cast(TableKind (not cs) as char(1)) as TableKind,
          ...
           from
          (
          select table_schema (not cs), table_name (not cs),
          (case table_type (not cs) when 'BASE TABLE' then 'T'
          when 'VIEW' then 'V' end)
          as TableKind
          from information_schema.tables
          union all
          select routine_schema (not cs),
              routine_name (not cs),
              'F' (not cs) as TableKind
          from information_schema.routines
          ) t;
                                                          1805
```

*Figure 18*

```
START TRANSACTION
   INSERT INTO TodaySales(Amount,Time) VALUES ('$1','07:35')
COMMIT
START TRANSACTION
   INSERT INTO TodaySales(Amount,Time) VALUES ('$3','09:39')
COMMIT
START TRANSACTION
   INSERT INTO TodaySales(Amount,Time) VALUES ('$2','13:58')
COMMIT
SELECT * FROM Employees
START TRANSACTION
   INSERT INTO TodaySales(Amount,Time) VALUES ('$7','15:34')
COMMIT
SELECT * FROM Departments
START TRANSACTION
   INSERT INTO TodaySales(Amount,Time) VALUES ('$5','23:26')
COMMIT
                                                                    2005
```

```
START TRANSACTION
   INSERT INTO TodaySales(Amount,Time) VALUES ('$1','07:35')
   INSERT INTO TodaySales(Amount,Time) VALUES ('$3','09:39')
   INSERT INTO TodaySales(Amount,Time) VALUES ('$2','13:58')
   INSERT INTO TodaySales(Amount,Time) VALUES ('$7','15:34')
   INSERT INTO TodaySales(Amount,Time) VALUES ('$5','23:26')
COMMIT
SELECT * FROM Employees
SELECT * FROM Departments
                                                                    2010
```

*Figure 20*

```
START TRANSACTION
SEL * FROM SALES WHERE CUSTOMER=123;
CREATE MULTISET VOLATILE TABLE TODAYSALE
   AS (SEL * FROM SALES WHERE
   TDATE > (CURRENT_DATE - INTERVAL '1' DAY))
   WITH DATA;
UPDATE SALES SET AMOUNT=100 WHERE CUSTOMER=456;
SEL * FROM TODAYSALE WHERE CUSTOMER=789;
SEL * FROM SALES WHERE CUSTOMER=123;
SEL * FROM PRODUCT WHERE
   ID IN (SEL CUSTOMER FROM TODAYSALE)
   AND PRICE>100;
COMMIT                                                    2205
```

```
START TRANSACTION
SELECT * FROM SALES WHERE CUSTOMER=123;
COMMIT
START TRANSACTION
CREATE MULTISET VOLATILE TABLE TODAYSALE
   AS (SEL * FROM SALES WHERE
   TDATE > (CURRENT_DATE - INTERVAL '1' DAY))
   WITH DATA;
COMMIT
START TRANSACTION
UPDATE SALES SET AMOUNT=100 WHERE CUSTOMER=456;
SELECT * FROM TODAYSALE WHERE CUSTOMER=789;
SELECT * FROM SALES WHERE CUSTOMER=123;
SELECT * FROM PRODUCT WHERE
   ID IN (SEL CUSTOMER FROM TODAYSALE)
   AND PRICE>100;
COMMIT                                                    2210
```

*Figure 22*

EMULATION OF DATABASE UPDATEABLE VIEWS FOR MIGRATION TO A DIFFERENT DATABASE

BACKGROUND

The advantages of modern data-warehouse-as-a-service (DWaaS) systems have motivated many companies to migrate from on-premises warehouse systems (e.g., Teradata or Oracle) to cloud-native systems (e.g., Microsoft Azure SQL or Amazon RedShift). However, this migration comes with challenges due to syntactic, semantic, functionality, and performance differences between data warehousing layers, requiring applications' queries to be rewritten and tested for the new platform. This rewriting and testing process can take years and cost tens of millions of dollars.

Adaptive data virtualization can reduce the costs of data warehouse migration by translating queries in real time from the on-premise system to the new vendor's SQL dialect. This considerably shortens the time required for rewriting data warehouse applications. However, applications' queries written for on-premises solutions are often highly optimized for the on-premises system, not the new DWaaS system. In addition, the queries may include customized features that exploit functionalities of the on-premise system which may not be available in the new DWaaS system. Therefore, simply rewriting the queries from the syntax of the on-premise system to the syntax of the DWaaS system is insufficient.

BRIEF SUMMARY

Some embodiments of the invention provide a novel database virtualization system (DVS) for automatically processing queries written and intended for one database system using a different database system, where the new ("target") database system does not support all of the same functionality as the original ("source") database system. Queries from a client or client application that are intended for the source database are intercepted by the database virtualization system and processed into a normalized query representation independent of any database platform. The normalized query can then be transformed into new queries that can be executed on the target database, which contains the (previously) migrated data. Upon receiving the result of the new queries from the target database, the results are similarly converted to the expected format of the source database system and provided to the client. From the perspective of the client, this "on-the-fly" process is seamless and transparent, so that the client is unaware that the query was not actually processed by the source database. Accordingly, there is no need to rewrite the client application for native queries to the target database.

In some embodiments, the database virtualization system augments the functionality of the target database in order to emulate certain features that are native to the source database but absent in the target database. Several examples of feature augmentation are presented, specifically: static emulation, dynamic emulation, emulation of updateable views, and catalog emulation.

Static emulation is the emulation of database object properties supported by the source database such as case sensitivity, set tables, default values, or certain data types (e.g., period data or byte type) which are not supported by the target database. In some embodiments, the database virtualization system (DVS) receives a query from a client. The query references an object in a source database, the object having two sets of properties. The DVS generates a full set of properties by retrieving one set of properties from the target database and retrieving the other set of properties from a metadata storage. Based on the full, combined set of properties, the DVS generates a new query for execution on the target database.

Dynamic emulation is the emulation of user-defined objects from the source database such as macros and stored procedures which are undefined on the target database. In some embodiments, the DVS receives a query referencing a set of operations (e.g., a macro or stored procedure) to perform on the source database. The DVS retrieves a definition for the set of operations from a metadata storage, and based on the retrieved definition, generates multiple queries. The generated queries successively execute on the target database and include at least one query that is generated based on a result of executing a previously generated query.

When supported by the source database, emulation of updateable views is necessary since in most target database systems, views are read-only queries that cannot modify the base tables. Views can be selectively restricted to certain users, such as a manager who has access to salary data from an employee table. However, some databases do allow modifications to a view, which propagates to the base tables in the database. In order to emulate this functionality on a target database that does not support updateable views, the updateable view must be translated to a query for the target database that modifies the data.

In some embodiments, the database virtualization system (DVS) receives a query for modifying data tuples presented in an updateable view defined for the source database. The DVS retrieves a definition of the updateable view from a metadata storage, the definition including a reference to a set of objects associated with the data tuples in the source database. Based on the retrieved definition, The DVS generates a second query referencing objects associated with the data tuples in the target database. The DVS then executes the generated query on the target database to modify the data tuples in the second database.

Catalog emulation is also necessary since any query referencing the database catalog of the source database would fail, because that catalog does not exist on the target database system. In some embodiments, catalogs are a collection of schemas, such as the SQL Information Schema. These schemas are a collection of system objects in some embodiments that describe the other objects in the database. In some embodiments, queries that access the catalog are referencing these system objects.

In some embodiments, the database virtualization system (DVS) receives from a client a query that requests a presentation of a system object of the source database. From a metadata storage, the DVS identifies a query for the target database that references system objects of the target database and generates the requested presentation of the system object of the source database. The DVS then replies to the client with the generated presentation.

In some embodiments, the database virtualization system also optimizes queries for the target database based on various characteristics of the target database that differ from those of the source database. Some examples of query optimization are here described, namely query batching and query unbatching.

Query batching is required in some embodiments when the target database imposes a higher cost on certain transactions than the source database does. In some embodiments, the database virtualization system (DVS) individually receives multiple queries from a database client where each query is written for a source database. The DVS performs an automated process to analyze properties of the target database to determine that the queries can be replaced by a single query to the target database. Based on that determination, the DVS combines the queries to generate a single query for the target database and forwards the generated single query to the target database for execution.

Query unbatching is used in some embodiments when the target database has stricter requirements on the types of database statements that can be grouped together in a single transaction. The database virtualization system (DVS) takes these characteristics and requirements into account by reordering queries to regroup the database statements. In some embodiments, the database virtualization system (DVS) receives a particular query from a database client, where the query is written for a source database. The DVS performs an automated process to analyze properties of the target database to determine that the received query should be replaced by multiple queries to the target database. Based on the determination, the DVS generates multiple queries for the second database and individually forwards each generated query to the target database for execution.

In some embodiments, information pertaining to feature augmentation is maintained by the database virtualization system as metadata associated with the objects referenced in the query. In the course of normalizing and transforming fully supported queries, the database virtualization system accesses metadata from the target database catalog that is associated with the referenced objects. However, for feature augmentation there is no corresponding metadata available in the target database catalog, since these features are unsupported. Accordingly, the metadata for feature augmentation is stored elsewhere in a separate storage maintained by the database virtualization system itself.

Furthermore, the database virtualization system also maintains information pertaining to query optimization as metadata associated with the supported target database systems. In some embodiments this metadata may be hardcoded as part of target database-specific routines. However, in other embodiments the metadata for query optimization is also stored in a metadata storage maintained by the database virtualization system. Storing this metadata in the metadata storage allows flexibility in adding support for more target systems and different versions.

In some embodiments, the metadata storage for feature augmentation and query optimization is maintained by the database virtualization system in a separate database instance. In other embodiments, the metadata storage is stored as a separate table in the target database system itself, to exploit existing target database backup and restore functionality.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 11 conceptually illustrates an example of a single-table MDStore of some embodiments.

FIG. 17 conceptually illustrates an updateable view with a variable scope.

FIG. 18 conceptually illustrates a mapping stored in MDStore for a system object in one database to system objects in another database.

FIG. 20 illustrates an example of query batching.

FIG. 22 illustrates an example of query unbatching.

DETAILED DESCRIPTION

Figure 1:
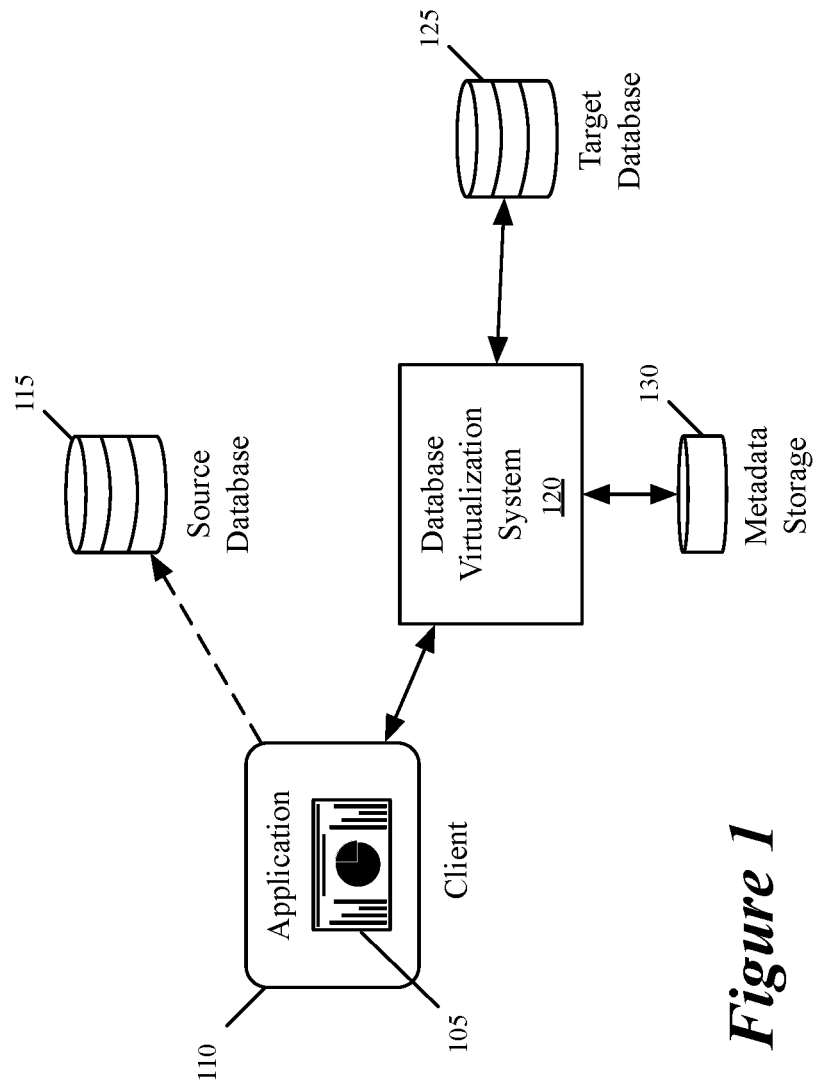
FIG. 1 conceptually illustrates a database virtualization system (DVS) of some embodiments.

Some embodiments of the invention provide a novel database virtualization system (DVS) for automatically processing queries written and intended for one database system using a different database system, where the new ("target")

database system does not support all of the same functionality as the original ("source") database system. Queries from a client or client application that are intended for the source database are intercepted by the database virtualization system and processed into a normalized query representation independent of any database platform. The normalized query can then be transformed into new queries that can be executed on the target database which contains the (previously) migrated data. Upon receiving the result of the new queries from the target database, the results are similarly converted to the expected format of the source database system and provided to the client. From the perspective of the client, this "on-the-fly" process is seamless and transparent so that the client is unaware that the query was not actually processed by the source database. Accordingly, there is no need to rewrite the client application for native queries to the target database.

In some embodiments, the database virtualization system augments the functionality of the target database in order to emulate certain features that are native to the source database but absent in the target database. For example, the target database may not support database object properties such as case sensitivity, set tables, default values, or certain data types (e.g., period data or byte type). In addition, the target database may not support operations such as updateable views. User-defined macros and stored procedures would also be undefined on the target database, since they would be written for the specific context, syntax, and language of the source database system. Finally, any query referencing the database catalog of the source database would fail, because that catalog does not exist on the target database system. Therefore, the database virtualization system must provide emulation for all of this functionality.

In some embodiments, the database virtualization system also optimizes queries for the target database, based on various characteristics of the target database that differ from those of the source database. For example, the target database may impose a higher cost on certain transactions than the source database does. Further, the target database may have stricter requirements on the types of statements (e.g., data definition statements and data manipulation statements) that can be grouped together in a single transaction. The database virtualization system takes these characteristics and requirements into account by adjusting transaction boundaries and reordering queries to regroup the data manipulation and data definition statements.

In some embodiments, information pertaining to feature augmentation is maintained by the database virtualization system as metadata associated with the objects referenced in the query. In the course of normalizing and transforming fully supported queries, the database virtualization system accesses metadata from the target database catalog that is associated with the referenced objects. However, for feature augmentation there is no corresponding metadata available in the target database catalog since these features are unsupported. Accordingly, the metadata for feature augmentation is stored elsewhere in a separate store maintained by the database virtualization system itself.

Furthermore, the database virtualization system also maintains information pertaining to query optimization as metadata associated with the supported target database systems. In some embodiments this metadata may be hard-coded as part of target database-specific routines. However, in other embodiments the metadata for query optimization is also stored in a metadata storage maintained by the database virtualization system. Storing this metadata in the metadata storage allows flexibility in adding support for more target systems and different versions.

In some embodiments, the metadata storage for feature augmentation and query optimization is maintained by the database virtualization system in a separate database instance. In other embodiments, the metadata storage is stored as a separate table in the target database system itself, to exploit existing target database backup and restore functionality.

The database virtualization system of some embodiments is conceptually illustrated in FIG. 1. An application 105 operating on a client system 110 issues a native query written and intended for a source database system 115. For example, the source database system may be an on-premises database system such as those provided by Teradata Corporation or Oracle Corporation. However, instead of routing the query to the source database system 115 (as shown by the dashed line), the query is instead routed (solid line) to the database virtualization system 120. The database virtualization system 120 then processes the query and issues a new query to a target database 125 in the target database's native format. For example, the target database may be a cloud database system such as Azure Data Warehouse or Amazon Redshift.

In some embodiments, the database virtualization system must request metadata pertaining to properties of the database objects in the original query. In cases where the target database supports all the features of the original query, the metadata lookup is targeted to the target database's catalog, located in the target database 125. However, when the target database does not support all the features of the original query, the database virtualization system 120 performs a lookup for additional metadata from a metadata storage 130 (also referred to as "MDStore") that is separate from the target database catalog and which is maintained directly by the database virtualization system 120. In some embodiments, the metadata storage is a key-value store.

Upon processing the new query generated by the database virtualization system, the target database 125 returns a result to the database virtualization system 120 in the native format of the target system. That result is converted to a new result in the format expected by the client application 105, which is then returned to the client system 110.

Figure 2:
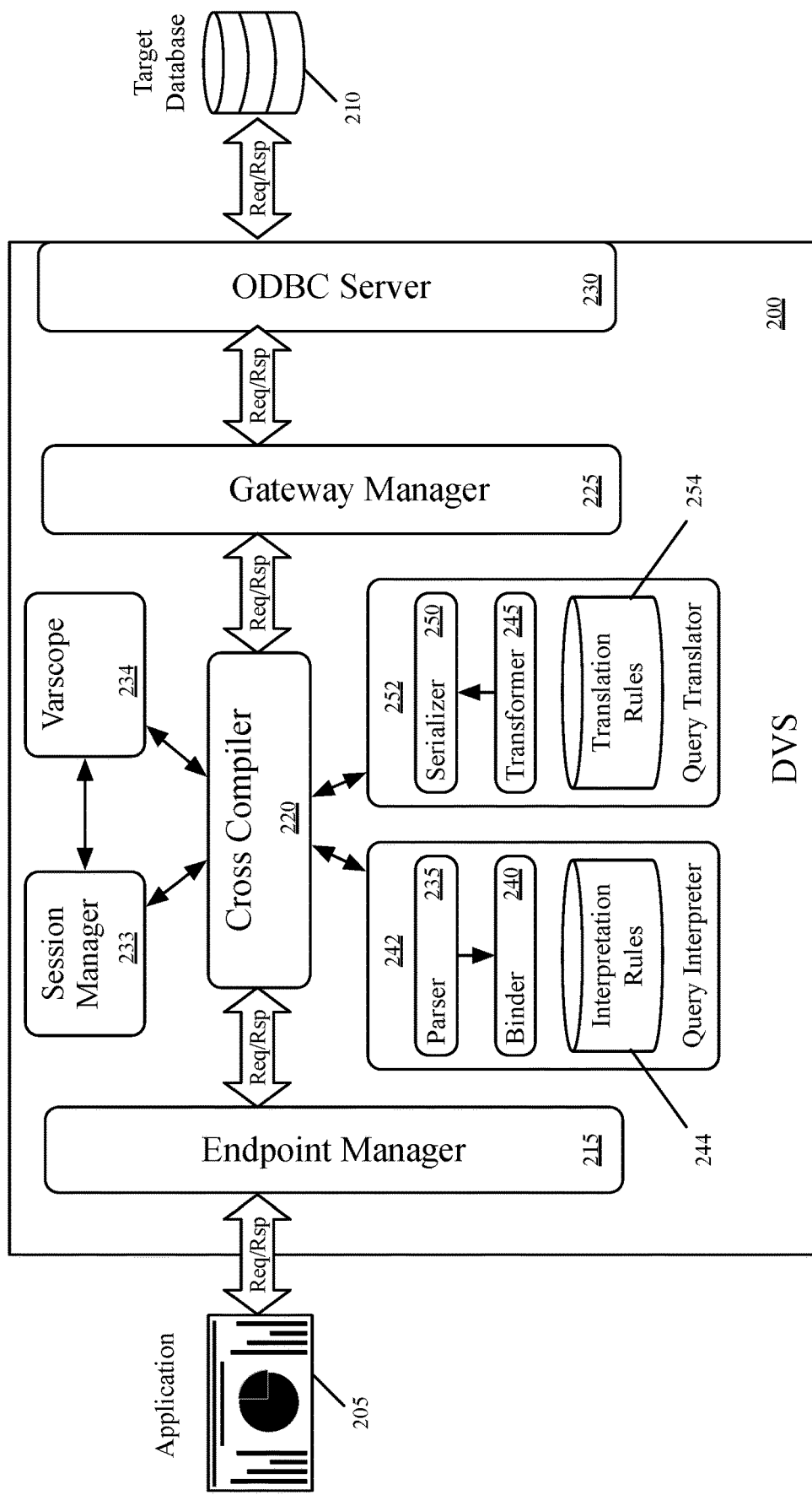
FIG. 2 conceptually illustrates an architectural overview of the DVS of some embodiments.

An architectural overview of the database virtualization system (DVS) is conceptually presented in FIG. 2. The DVS 200 is deployed between a client application 205 and a target database 210 and intercepts all network traffic between them. In some embodiments the applications execute on client machines, which may be either physical computers, virtual machines (VMs), or containers operating within a VM. The system 200 extracts queries (also referred to as "requests") sent by an application 205, and extracts responses that are returned from the database 210 to the application. The DVS 200 ensures the queries sent by the application 205 are correctly cross-compiled into equivalent queries in the syntax that the target database system 210 understands, and all results returned by the target database are transformed to the format expected by the application. This concept is similar in nature to a hypervisor, which abstracts hardware or operating system details from application code. By virtualizing the database access, in some embodiments the DVS 200 allows enterprises to re-platform their applications by changing the backend "target" database without the need for any costly rewriting of application code.

At the core of the DVS is an extensible universal language-agnostic query representation called eXtended Relational Algebra (XTRA). Incoming queries are mapped to XTRA trees, which can then be serialized in the SQL dialect spoken by the target database system. The XTRA representation is an algebraic representation of the query that is independent of any database system. Further details on the XTRA representation can be found in U.S. Patent Publication 2016/0328442, filed on May 9, 2016, titled "Method and System for Transparent Interoperability Between Applications and Data Management Systems," incorporated herein by reference.

In order to keep the application layer intact, client applications 205 must connect to the DVS in the same way that they would connect to the original source database. This is achieved in some embodiments by an Endpoint Manager 215, which listens to incoming messages on the port used by the original database, parses the incoming messages, and extracts the query from the messages. The Endpoint Manager 215 then sends the query text to the Cross Compiler component 220 which in some embodiments triggers parsing, binding, transforming, and serializing the query (or the corresponding query response) into the equivalent SQL that would be executed by the target database, as described in further detail below.

In some embodiments, a Gateway Manager 225 handles connections with the target database systems 210. The Gateway Manager may include in some embodiments an Open Database Connectivity (ODBC) Server component 230 which is an abstraction of the ODBC Application Programming Interfaces (APIs) that allows the DVS 200 to communicate with different target database systems using their corresponding ODBC drivers. ODBC APIs provide means to submit different kinds of requests to the target database for execution, ranging from simple queries/requests to multi-statement requests, parameterized queries, and stored procedure calls. In some embodiments, the ODBC Server 230 is implemented as a separate component from the Gateway Manager 225.

The ODBC Server 230 also receives the response to the query from the target database 210 and passes it back to the Cross Compiler 220 for processing into a format understood by the client application 205. In some embodiments, processing the response also includes some combination of parsing, binding, and serializing operations. The Cross Compiler 220 then returns the properly formatted response to the Endpoint Manager 215 for communication of the results to the client application. The Endpoint Manager then passes the results of the query back to the client application.

The Cross Compiler also communicates with a Session Manager 233 while processing queries and results. The Session Manager keeps track of active sessions between the Database Virtualization System, the client application, and the target database. It further tracks ongoing transactions and whether there is any associated storage 234 for temporary variables or database objects during the session, such storage referred to in some embodiments as the session's "Varscope". In some embodiments the Varscope 234 is maintained by the Session Manager 233, and in other embodiments the Varscope is maintained separately from the Session Manager by the database virtualization system.

Figure 3:
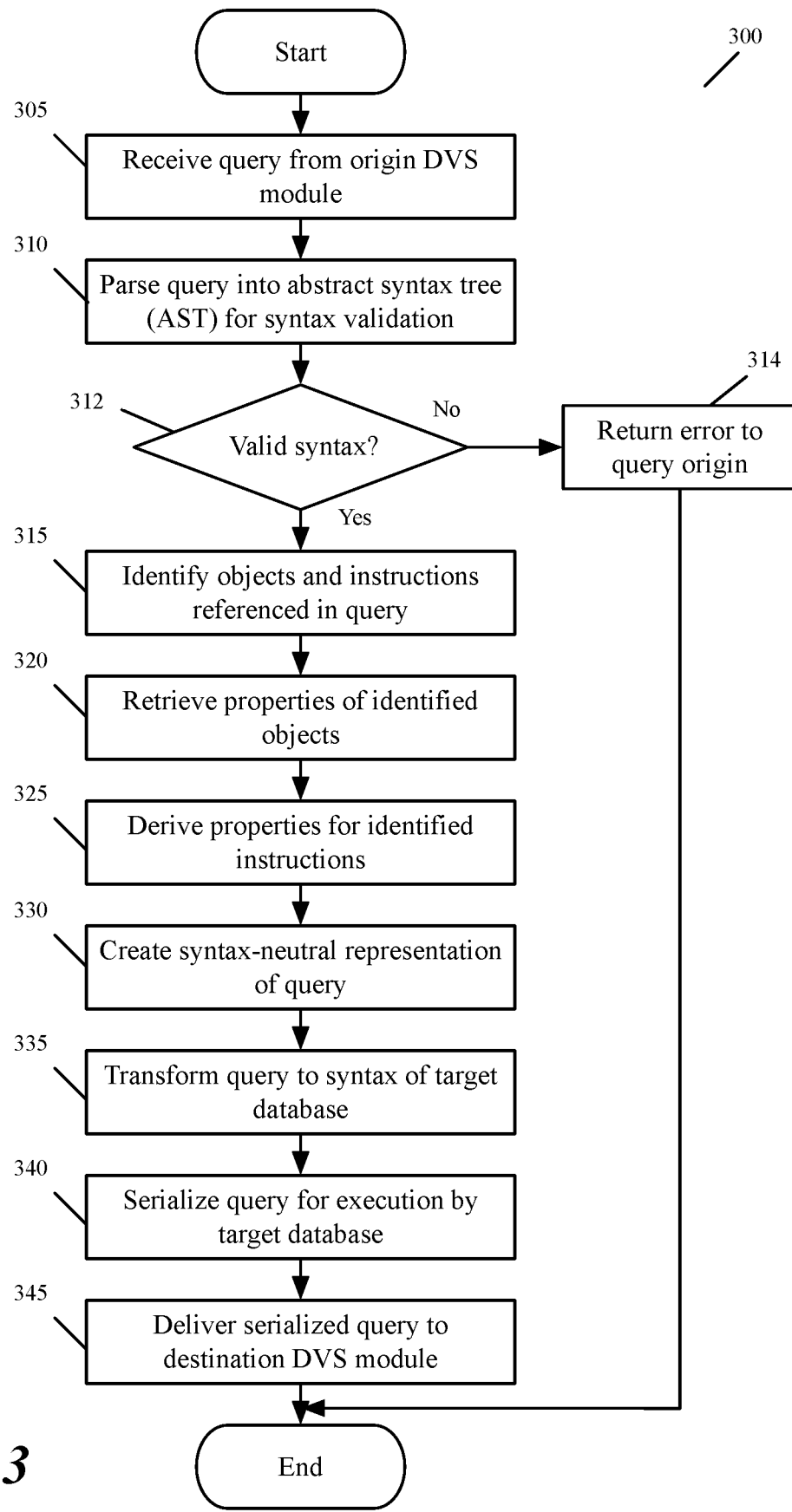
FIG. 3 conceptually illustrates a process performed in some embodiments by the components associated with a Cross Compiler.

In some embodiments, the parsing, binding, and serializing functions of the Cross Compiler 220 are performed by separate components. These components may be components of the Cross Compiler 220 or may be separate modules whose operations are managed by the Cross Compiler. FIG. 3 conceptually illustrates a process 300 performed by these components associated with the Cross Compiler 220 in some embodiments.

As shown, the process 300 begins when the Cross Compiler 220 receives at 305 a query from the Endpoint Manager 215 in some embodiments. In other embodiments, the Cross Compiler may receive the query from other modules of the database virtualization system (DVS). At 310, the process 300 parses the query and maps the input SQL text to an abstract syntax tree (AST) which captures the high-level query structure. As an example, the input SQL text may contain proprietary commands specific to the source database, e.g. SEL and INS in Teradata, which are replaced with their equivalent standard SQL commands SELECT and INSERT.

In some embodiments, operation 310 is performed by a rule-based Parser component 235, which implements the grammar of the original database system. Based on rules that are defined for each type of source database format, the Parser evaluates (at 312) whether the grammar of the query syntax is correct. The Parser 235 does not, however, validate the actual database objects or instructions. If the grammar is incorrect, then the Parser returns an error message (at 314) and the process 300 ends.

If the grammar is valid, the process 300 identifies (at 315) the database objects and instructions referenced in the query from the parsed AST representation. In some embodiments, this operation is performed by a Binder component 240, which receives the AST representation from the Parser component 235. The Binder component 240 resolves the names of the database objects by performing (at 320) metadata lookups to retrieve properties associated with those objects. These properties include object types (e.g., table, column, view, etc.), object names, data types, etc.

In addition, the Binder component 240 employs a property derivation framework that allows it to derive properties of the instructions (at 325) that are necessary for the correct binding of the query. These properties include query statement types (select/insert/delete, etc.), output columns of operators, and data types of expressions. The property derivation framework is extensible and allows the implementation of properties that may be used by other components of the DVS 200. For example, one can derive the tables accessed in read or write operations and determine which columns are used in selection and join predicates. This information can be used to advise on physical database design, index creation and statistics collection. In some embodiments, the property derivation framework requires metadata lookups.

After retrieving the properties of the identified objects and instructions from the metadata lookup and the property derivation framework, the Binder component 240 then binds the query (at 330) to an SQL-dialect-neutral representation using XTRA. This representation is also referred to as the XTRA query tree. In some embodiments, the XTRA representation is an annotated and translated version of the AST representation.

Figure 4:
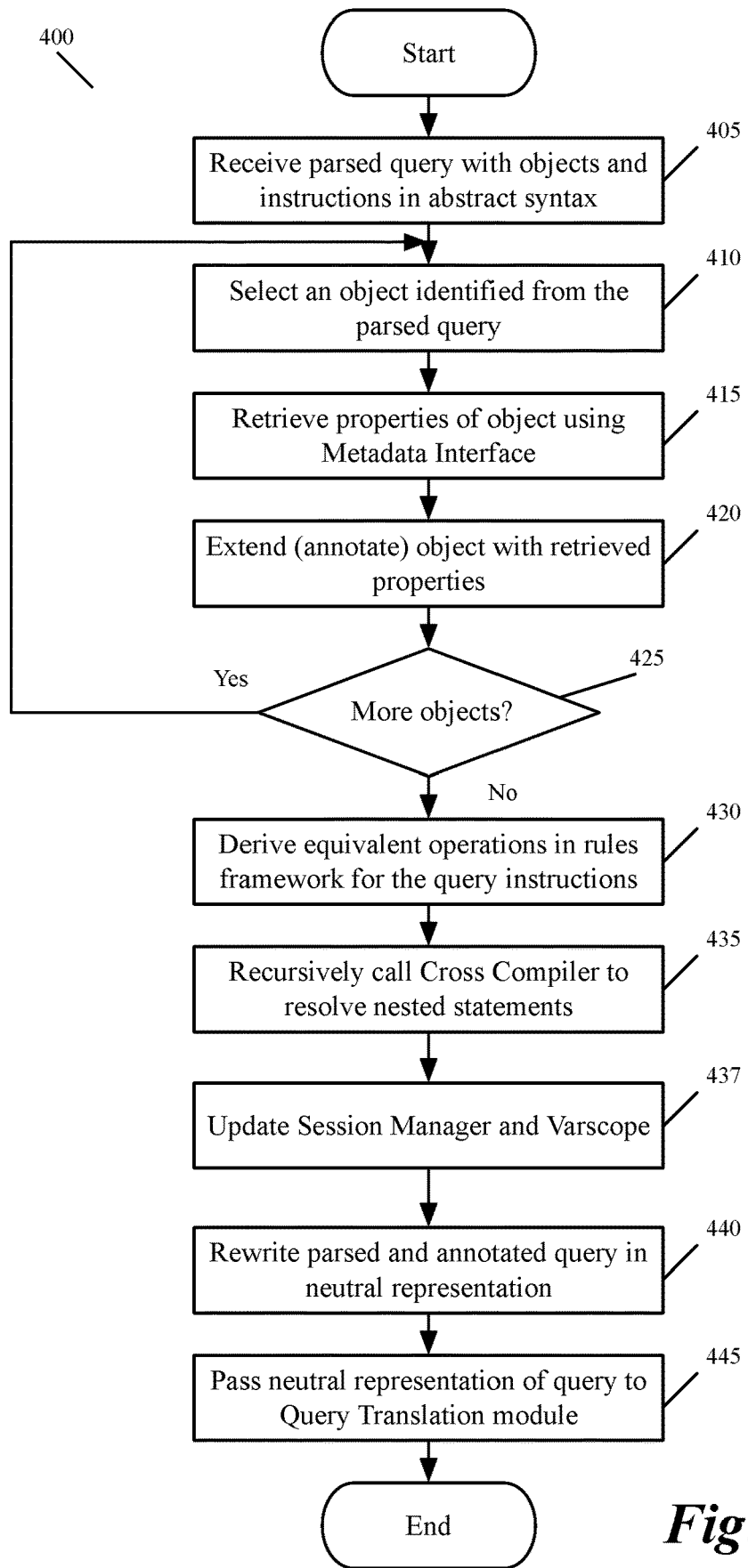
FIG. 4 conceptually illustrates an example of a process performed in some embodiments by the Binder component.

A more detailed example of the process 400 performed by the Binder in some embodiments is illustrated in FIG. 4. The operations performed by this process may occur in a different sequence than that illustrated or may not be performed. The process begins at 405 by receiving the parsed query in the AST representation. In some embodiments, the query was parsed by the Parser into database objects (e.g., tables, columns, views, etc.) and instructions (e.g. SQL statements such as SELECT, INSERT, etc.). In some embodiments, the Binder receives the parsed query from a concurrent Cross Compiler process, as part of a recursive call.

The process 400 identifies and selects at 410 one of the objects. The process retrieves at 415 the metadata associated with the selected object by issuing a lookup request via a Metadata Interface (MDI), which performs the metadata lookup using the target database catalog and/or the metadata storage, as discussed in further detail below.

After receiving the properties, the process then extends the selected object at 420. In some embodiments, this is equivalent to annotating the AST or XTRA representation of the object. The process then determines at 425 if there are additional objects in the query. If so, the process 400 returns to 410 to select the next object and performs the same operations 415-420. If there are no additional objects, the process 400 identifies the operations from the AST representation and derives at 430 equivalent operations using the property derivation framework.

In some embodiments, one or more of the referenced objects may be a dynamic object that contains nested statements of its own. For example, the dynamic object may be a stored procedure or a macro. Macros in some embodiments are simpler versions of stored procedures which do not have control flow (e.g. loops) but do have input arguments. As other examples, the nested statement may also be a definition of an updateable view, or a reference to a catalog from the source database that must be emulated on the target database.

In these cases, the process 400 recursively calls the Cross Compiler at 435 to resolve the nested statements. In some embodiments, the process 400 must wait for the recursive call to the Cross Compiler to complete and return the definition of the nested statements before the process 400 can continue. This recursive call could be initiated on a per object basis or after all objects have been identified and extended with retrieved properties.

In some embodiments, this recursive call is part of an ongoing session, so the Binder also communicates at 437 with the Session Manager 233 to maintain parameters related to the session state. In some embodiments, the Binder also communicates at 437 with the Varscope 234 to maintain temporary variables and control flow variables, such as those associated with dynamic emulation of stored procedures and macros.

At 440 the process 400 rewrites the parsed and annotated query, using the derived operations, into the database neutral XTRA representation. In some embodiments this operation is performed by consulting the property derivation framework. This XTRA representation is then passed at 445 to the Transformer for database-specific optimization, as described in further detail below.

Figure 5:
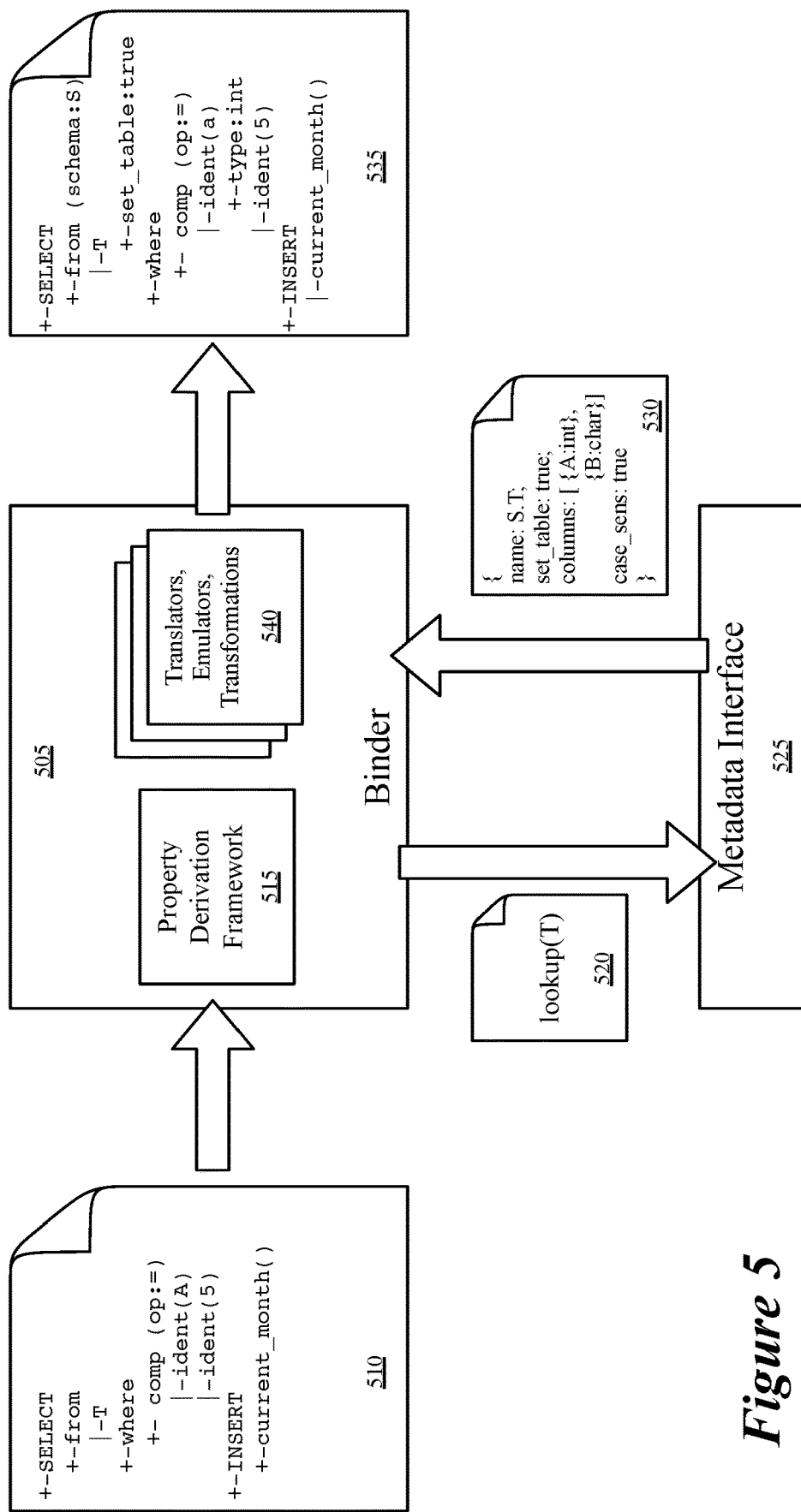
FIG. 5 conceptually illustrates a use case example of the Binder of some embodiments.

A use case example of the Binder performing some of these operations is conceptually illustrated in FIG. 5. The Binder 505 receives a query from the Parser (not shown) in the source database syntax and represented in AST format 510. The Binder 505 consults a property derivation framework 515 to identify objects in the query and determine whether a metadata lookup is required. If so, it issues a lookup command 520 for the database object T to the metadata interface MDI 525. The MDI 525 returns a data structure 530 with extended properties of the database object T, specifically that T is located in database schema S, that T is a table object, and that T has two columns A and B with data types integer and character, respectively. Since these are supported properties of the database object, these properties were retrieved from the target database catalog by the MDI 525.

In this example, the data structure also specifies that column B has the property of case sensitivity. This is a feature that is only available on certain database systems, for example in the scenario where the source database is Teradata (which supports case sensitivity) and the target database is Azure (which does not). Accordingly, the MDI retrieves this property from MDStore, since it will not be available in the Azure catalog. The MDI combines the metadata from the target database catalog and MDStore into the single structure 530 that is provided to the Binder 505 in response to the lookup request 520 on database object T. In some embodiments, all available properties associated with the data object are returned by the MDI 525, including metadata (such as the case sensitivity property in this example) that is not required by the current query. These properties may then be cached for use by subsequent queries. In other embodiments, only metadata required by the query is retrieved.

The Binder 505 then processes the data structure 530, the translated instructions, and the AST representation 510 to generate the XTRA representation 535 of the query. The Binder 505 has several modules 540 for translation and emulation in some embodiments, which it uses to perform the translation and emulation operations on the AST query representation 510 in order to generate the XTRA representation 535.

Figure 6:
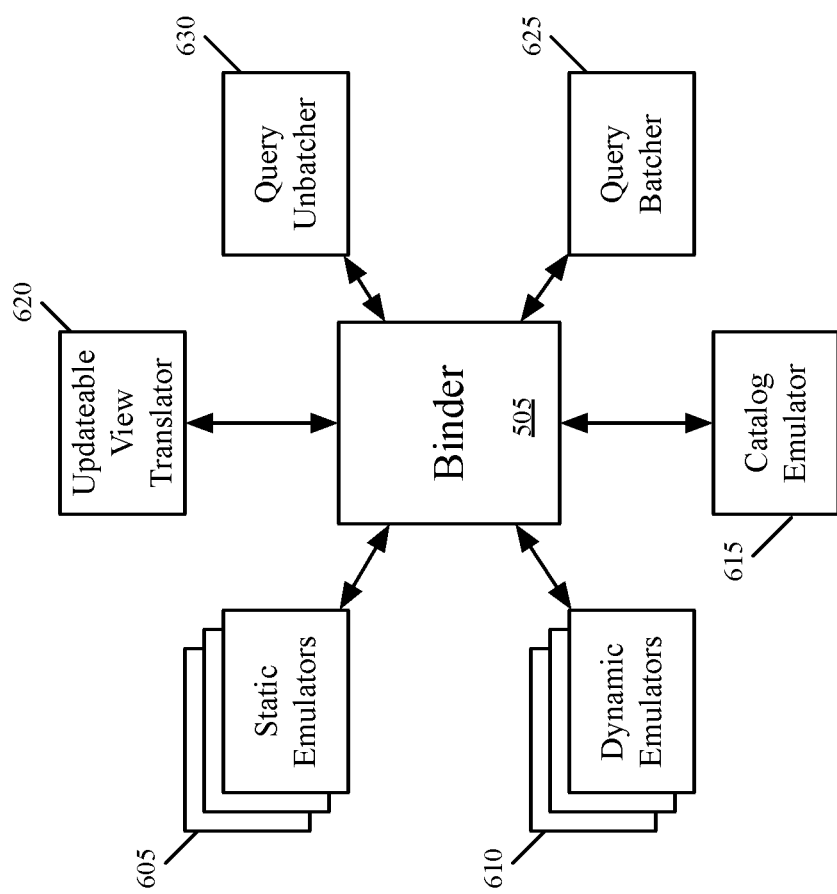
FIG. 6 conceptually illustrates examples of some translation and emulation modules of the Binder in some embodiments.

Examples of some of the translation and emulation modules of the Binder are conceptually illustrated in FIG. 6. Static emulators 605 process queries that emulate simple properties of data objects, such as data types, default values, and case sensitivity. Dynamic emulators 610 process queries that emulate complex constructs, such as stored procedures and macros, which have control language (e.g., loops, Booleans, conditionals, and other control logic) and input arguments that modify the database operations. These types of queries may have nested statements that must be interpreted by issuing a recursive call to the Cross Compiler.

The Binder 505 may in some embodiments also have emulators for emulating the source database catalog (615) and translating updateable views (620). The source database catalog is assumed to exist by the client application, since it issues queries under the assumption that they will be processed by the source database system. Updateable views are not usually supported by most databases, and therefore require translating the modifying operation on the view from the source database to a corresponding SQL operation on the target database's base tables. As with dynamic emulators, these modules may also issue recursive calls to the Cross Compiler as needed for interpreting nested statements.

Finally, the Binder 505 may also utilize transformations for batching (625) and unbatching (630) queries in some embodiments. For example, if the target database incurs a large overhead in executing single-row data manipulation language (DML) requests, a transformation that batches a large number of contiguous single-row DML statements into one large statement could be applied. Alternatively, if a target database imposes constraints on how DML statements and data definition language (DDL) statements are grouped, a transformation could be applied that unbatches a large query containing mixed DDL and DML statements into an ordered sequence of queries of either DDL or DML statements. The modules for query batching and unbatching may also issue recursive calls to the Cross Compiler to interpret nested statements as needed.

The Binder and Parser modules are in some embodiments part of a Query Interpreter Module 242. This is because these components operate to take the incoming query and interpret it from the native syntax to AST and then from AST to XTRA representation. In other words, the Parser and Binder are a kind of compiler that takes raw queries as input and outputs a compiled algebraic representation. The Query Interpreter also stores interpretation rules 244 that are used by the Parser and Binder. For example, interpretation rules in some embodiments include the syntax parsing rules used by the Parser, and/or the property derivation framework used by the Binder. In some embodiments, the Query Interpreter is also referred to as the Algebrizer, since its ultimate output is the algebrized XTRA representation.

Returning to FIG. 3, the process 300 applies (at 335) transformations to the query, to ensure correctness and optimality of the XTRA query tree for execution of the query on the target database. In some embodiments, this operation is performed by a Transformer component 245, which is a rule-based engine with pluggable components for transformations that can be shared across different databases and application requests. In some embodiments, the transformations are pattern-matching rules that are triggered when one pattern is detected, and then specify to replace the detected pattern with another pattern.

Transformations for correctness are needed when the target database has different rules for performing certain operations. For example, the original source database may allow direct comparison of two data types by implicitly converting one to the other. The new database may not have the same capability and would therefore require the conversion to be explicitly spelled-out in the query request. In this case, a transformation needs to be applied that first explicitly casts one data type to another data type, and then performs the comparison.

Transformations for optimality are also used to tailor the query for maximizing performance. In some embodiments, transformations are shared as modules with other components of the Cross Compiler. For example, the transformations for query batching and unbatching could be shared with the Binder and invoked from either the Binder or the Transformer.

In some embodiments, the Transformer 245 also performs metadata lookups that are specific to the target database. If the required metadata was not provided from the Binder, it must be captured by the Transformer using a database-specific transformation. These database-specific transformations are triggered when a query of the corresponding target database type is received, and results in a lookup call to the MDI.

Figure 7:
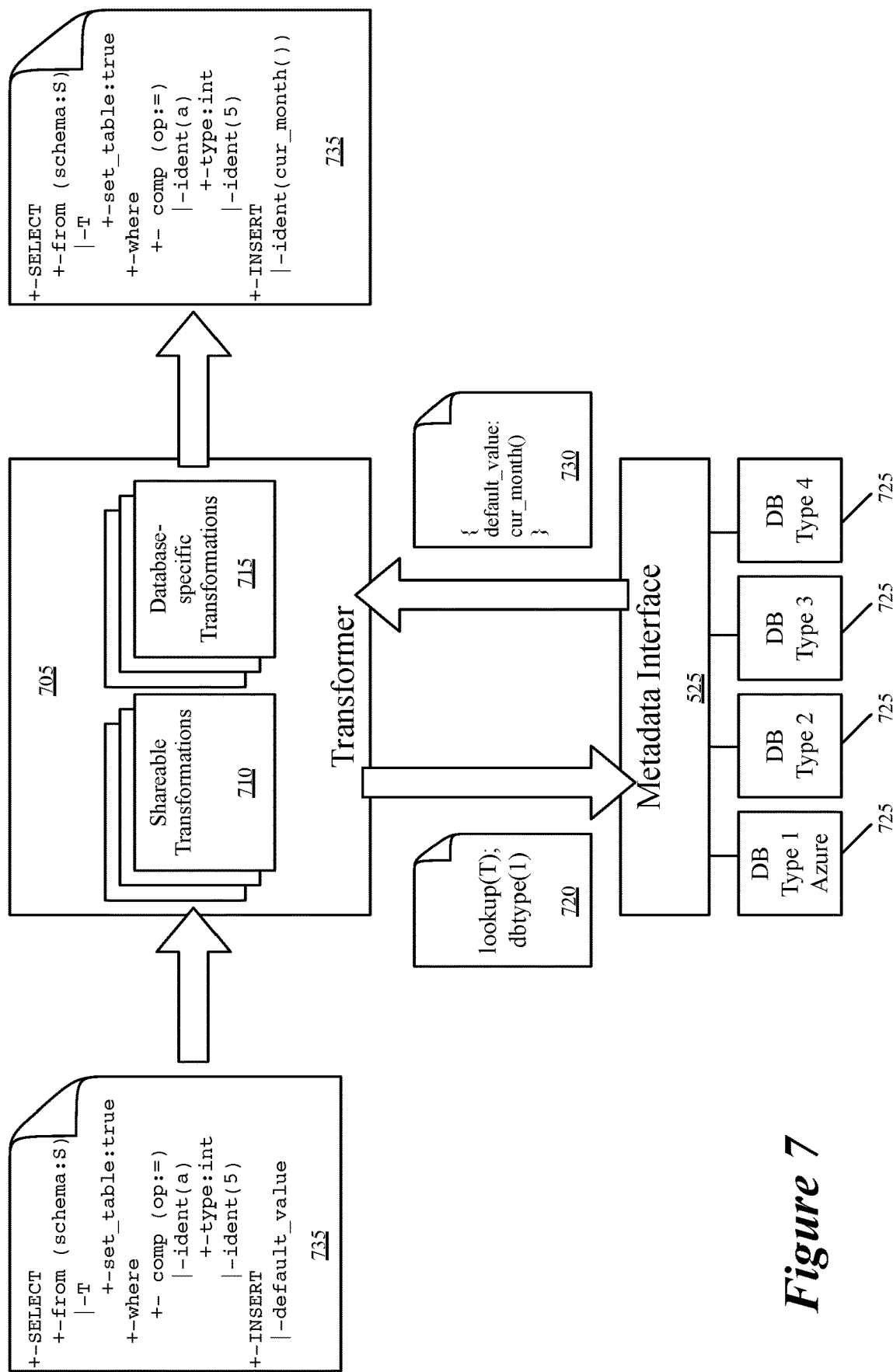
FIG. 7 conceptually illustrates the Transformer performing operations in the use case example of FIG. 5.

An example of the Transformer performing these operations in one embodiment is conceptually illustrated in FIG. 7, which continues the example of FIG. 5. The Transformer 705 includes shareable transformations 710 for correctness and optimality of queries, as well as database-specific transformations 715 for metadata lookups. In this example, the source database is Teradata and the target database is Azure.

The Transformer receives the query in XTRA representation 535 from the Binder 505, which includes a statement to insert the current value of the month to the selected rows of column A in table T. Since default values are permitted in SQL, the Binder 505 has not requested metadata for the default value. Database systems that do support the feature of default values would be able to process the Binder-generated XTRA representation 535 without any need for additional information.

However, since in this example the target database is Azure, the default value property is not supported. Therefore, an Azure-specific transformation 715 is triggered, since the Transformer detects that an INSERT statement with no value is specified to a column with the default-value property specified in MDStore. This transformer initiates a metadata lookup call 720 to the MDI 525 that specifies the database object as well as the target database type.

The MDI 525 receives the lookup request 720, but since the lookup request also includes the target database type, the MDI processes the lookup request using one of the database-specific modules 725. The resulting data structure 730 returned to the Transformer from the MDI includes the metadata pertaining to calculating the default value, namely that the default value is the current month. The Transformer then processes the XTRA representation to account for the additional metadata. Actual evaluation of the default value (in this example, if the current month is December, the value resolves to 12) is delegated in some embodiments to the target database. The transformer does this by in-lining the expression for evaluating the value into the INSERT statement. The result is an XTRA representation 735 which has been further extended to specify the default value for the INSERT statement.

Returning to FIG. 3, the process 300 serializes (at 340) the XTRA representation into SQL statements in the syntax of the target database for execution. In some embodiments, this operation is performed by a Serializer component 250. Since different database systems use different SQL dialects, each supported target database has its own Serializer module that generates SQL according to the specific keywords and query constructs of the target database. Since most systems support a large subset of standard ANSI SQL syntax, much of the Serializer code is shared across different database systems. Serialization takes place in some embodiments by walking through the XTRA expression, generating a SQL block for each operator, and then formatting the generated blocks according to the specific keywords and query constructs of the target database.

At 345, the serialized query is then delivered to the Gateway Manager 225, as discussed above. The process 300 then ends. In some embodiments, the entire Cross Compiler process 300 is invoked recursively from other components of the Cross Compiler of the database virtualization system, such as the Binder. In that situation, the request would not be received by the Endpoint Manager or delivered to the Gateway Manager, but whatever component initiated the Cross Compiler call instead. In such situations, only a portion of the process 300 may be performed, depending on the requirement of the calling component. For example, if the Binder 240 recursively calls process 300 to interpret a nested object, it may not need the Cross Compiler 220 to perform the Transformer or Serializer operations 335-340.

The Transformer 245 and Serializer 250 components are in some embodiments part of a Query Translator Module 252. This is because these components operate to take the normalized query and translate it from the database-agnostic XTRA representation to the SQL syntax of the target database. The Query Translator also stores translation rules 254 that are used by the Transformer and Serializer. For example, in some embodiments, these rules include the transformations used by the Transformer, and/or the serialization rules used by the Serializer.

Figure 8:
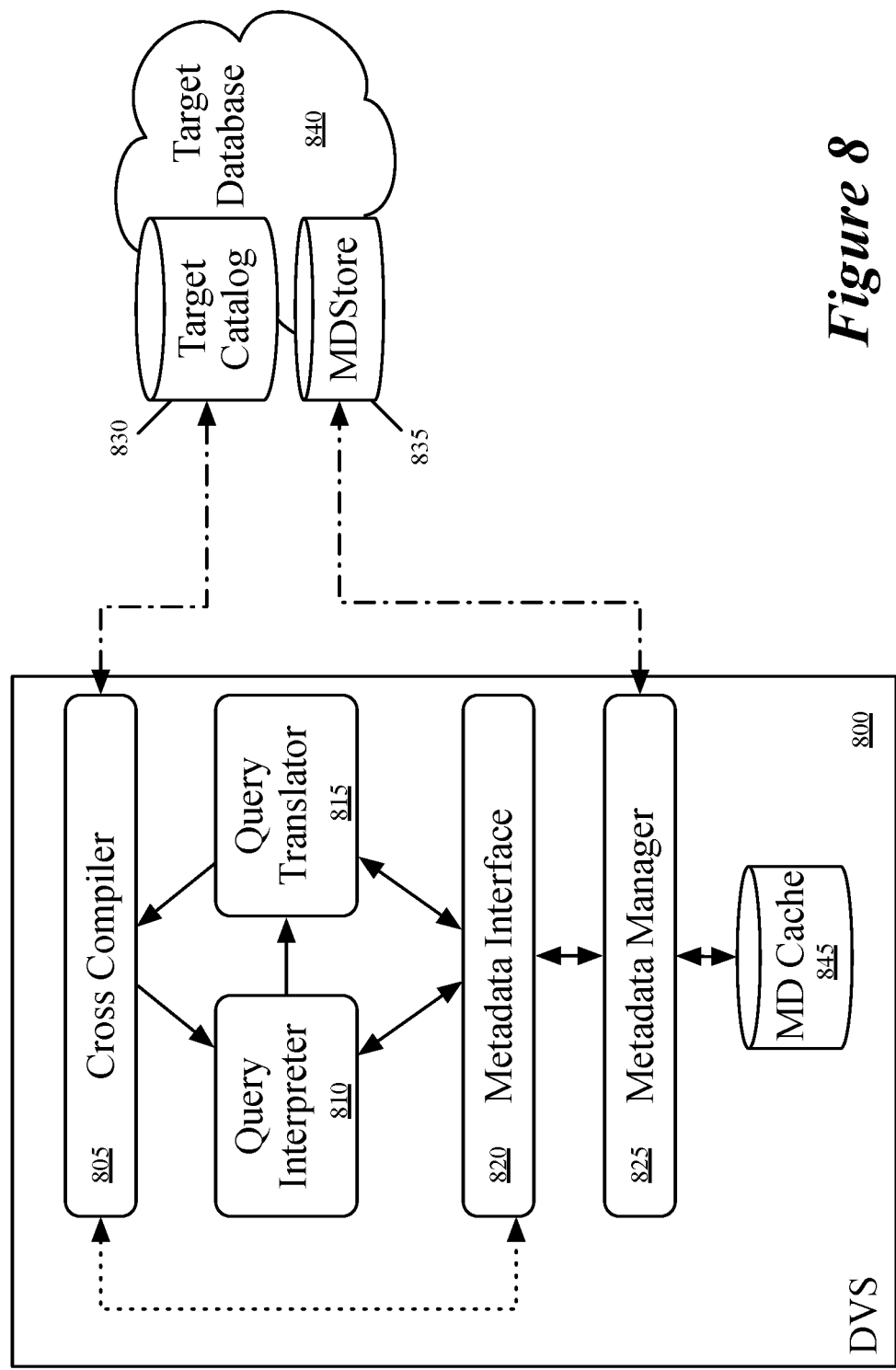
FIG. 8 conceptually illustrates a DVS system architecture for processing metadata lookup requests of some embodiments.

As noted above, in some embodiments the Binder and Transformer perform metadata lookup requests via a metadata interface (MDI) when processing queries. FIG. 8 conceptually illustrates the DVS 800 system architecture for processing these metadata lookup requests. As described above, in some embodiments the Cross Compiler 805 passes an incoming query to the Query Interpreter 810 for parsing and normalizing into the XTRA representation, which is then passed to the Query Translator 815 for generating the serialized SQL statements for execution by the target database. Both the Query Interpreter 810 and the Query Translator 815 may issue metadata lookups via the metadata interface (MDI) 820. The MDI functions as an interface to a Metadata Manager (MDM) 825 which is responsible for formulating and initiating the queries to retrieve metadata from the target database catalog 830 and the MDStore 835. In some embodiments, the MDStore 835 is also maintained in the target database 840 (e.g., a cloud-based database such as Azure) alongside the target database catalog 830 by the database virtualization system 800. The retrieved metadata is cached in some embodiments in a metadata cache 845 by the MDM for use by other queries to the Cross Compiler 805 during the same session. In some embodiments, concurrent Cross Compiler sessions are served by a single MDM process.

Figure 9:
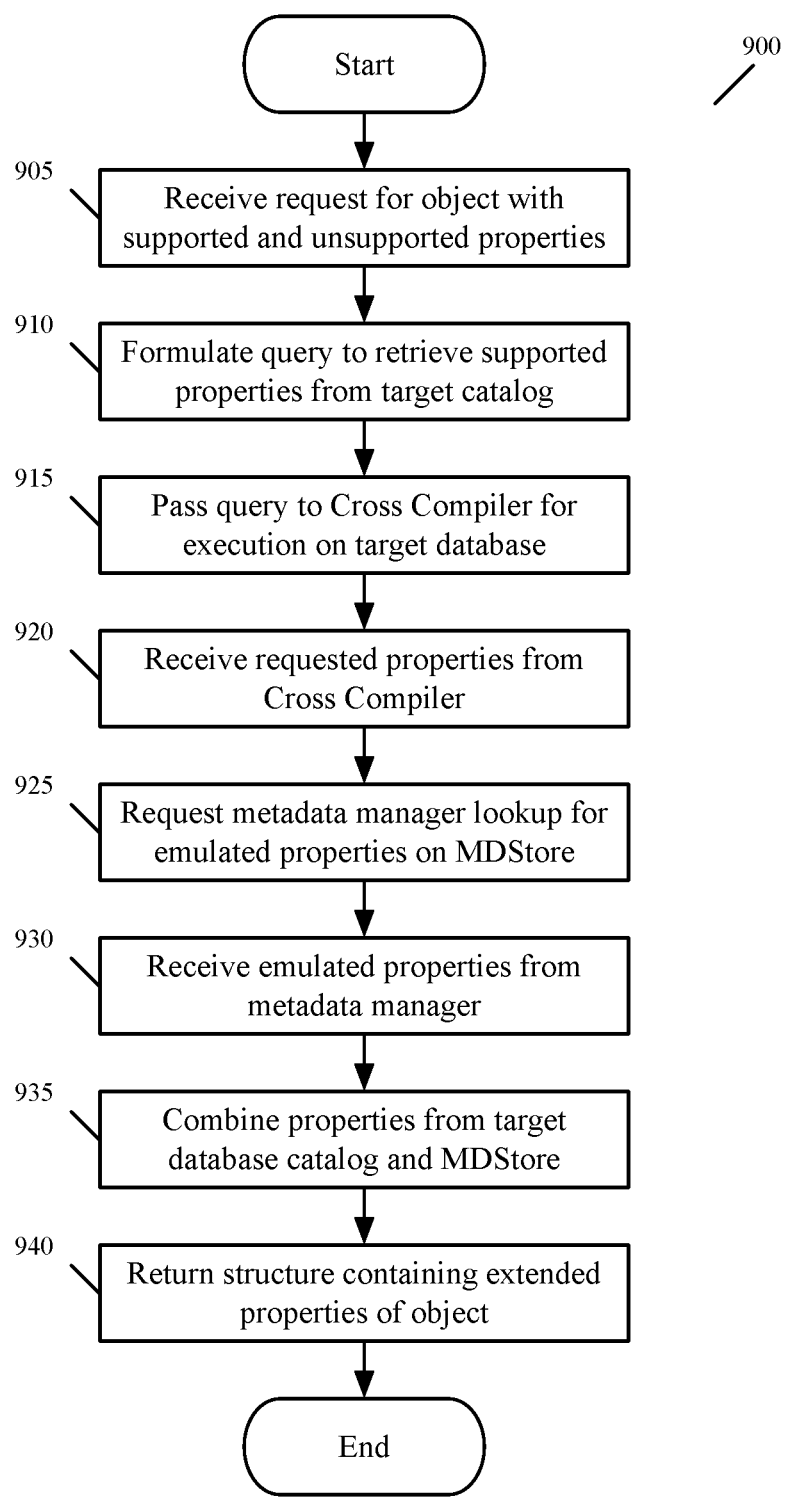
FIG. 9 conceptually illustrates a process performed in some embodiments by the Metadata Interface to lookup metadata.

FIG. 9 illustrates a process 900 performed by the MDI 820 and other components illustrated in FIG. 8 to resolve these lookup requests. The process 900 begins at 905 by receiving a request for metadata associated with a referenced object. This request can be received as discussed above from the Binder component of the Query Interpreter 810 or the Transformer component of the Query Translator 815. In some embodiments, the Binder and Transformer first perform a lookup on the Varscope of the current session (not shown) to see if the object is a volatile object stored there. If the object is not found in the Varscope, then the Varscope forwards that request to the MDI 820.

After receiving the query, the MDI 820 formulates a query at 910 for the target database catalog, to retrieve metadata from the target database catalog for the properties of the object that are supported by the target database. Since this query is intended to execute on the target database, the MDI 820 must pass the query at 915 to the Cross Compiler 805, which will then recursively process it as a separate invocation of process 300. This query from the MDI 820 to the Cross Compiler 805 is indicated by a dotted line in FIG. 8 to distinguish it from the primary flow of the original query received by the MDI itself.

After the Cross Compiler 805 executes the query for supported properties on the target database, it receives the result from the target database and processes it into the format expected by the MDI 820. In some embodiments the expected format is the XTRA representation, which means that the Cross Compiler does not need to invoke the Query Translation component for this recursive call. This request and response from the Cross Compiler to the target database catalog 830 is indicated by the dot-dash line in FIG. 8. The MDI 820 then receives at 920 the requested properties from the Cross Compiler 805.

In addition, the MDI 820 sends a lookup request at 925 to the MDM 825 for properties of the data object that are not supported by the target database, and which must be emulated by the database virtualization system 800. In some embodiments, this lookup request occurs prior to or in parallel with the query issued to the Cross Compiler (at 915). The MDI 820 distinguishes between supported properties and emulated properties in some embodiments by using the database-specific modules 725 referred to in FIG. 7.

The MDM 825 executes the lookup request from the MDI 820 to retrieve the emulated properties from the MDStore 835. The MDI 820 then receives at 930 the emulated properties from the MDM 825. The MDI 820 combines at 935 the emulated properties from the MDStore (via the MDM) with the supported properties from the target database catalog (via the Cross Compiler) into a single data structure. In one sense, the properties of the object in the target database have been extended with additional properties from the MDStore 835. The data structure containing these extended properties for the referenced object is then returned at 940 to whichever component requested it. The process 900 then ends.

Figure 10:
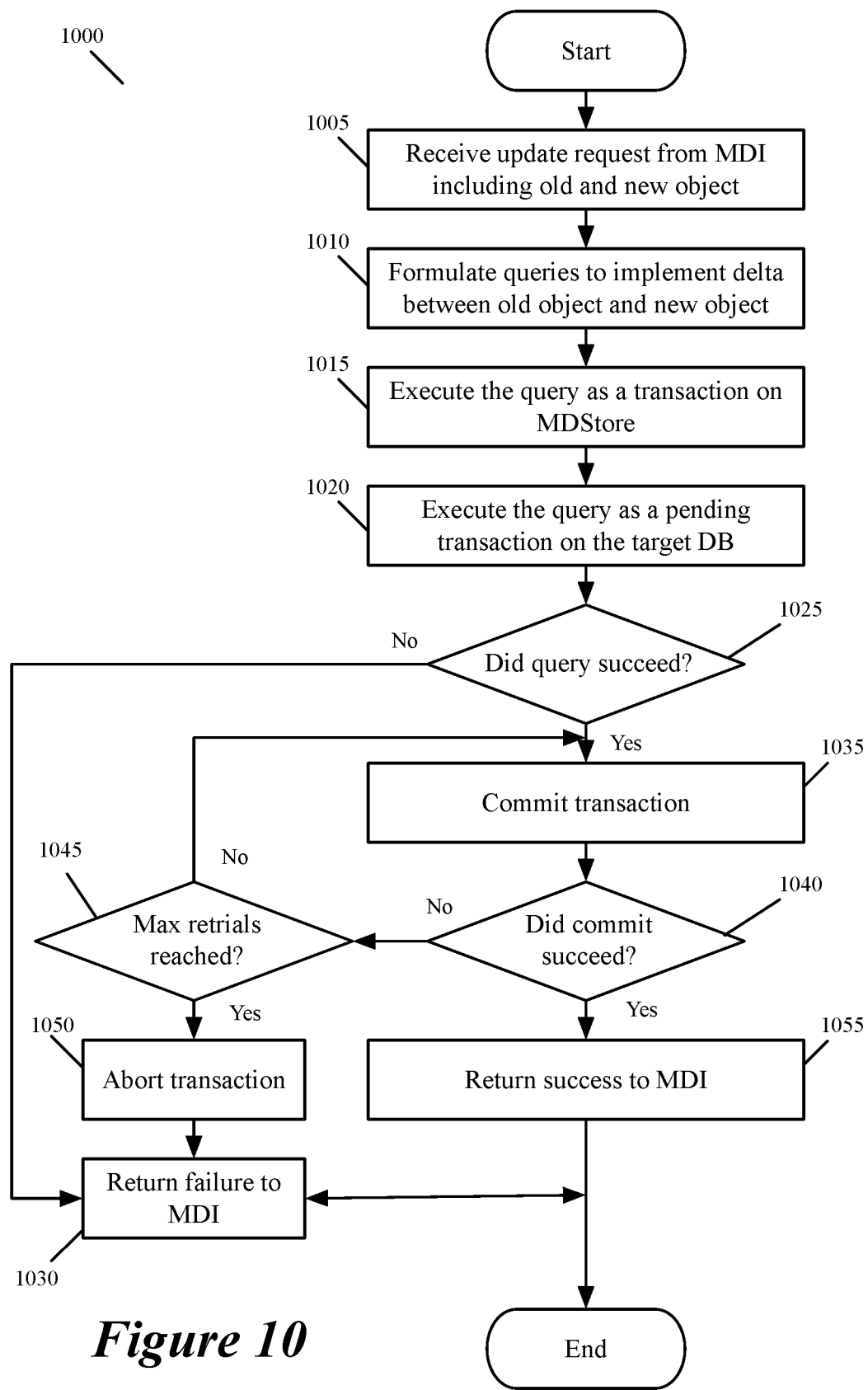
FIG. 10 conceptually illustrates a process performed in some embodiments by the Metadata Manager for updating metadata.

The MDStore 835 is not solely a read-only construct but is also updated as necessary after changes to the data properties of the referenced objects (e.g., receiving a query containing a DDL statement such as ALTER, CREATE, DROP, etc.). FIG. 10 conceptually illustrates a process 1000 performed in some embodiments by the MDM 825 for updating metadata in the MDStore 835. The process 1000 begins when the MDM receives at 1005 a request from the MDI 820 to begin the update, along with the old version of the object that needs to be updated, and the updated version. In some embodiments, the updated object is in the XTRA representation, as the result of processing a request from a client with the Cross Compiler.

The MDM 825 uses the old and new objects to formulate (at 1010) a series of queries required to implement the difference between them (also referred to as the "delta") in the target database catalog 830 and MDStore 835. The query is executed (at 1015) as a transaction on the MDStore 835, and the same query is used to initiate a pending transaction (at 1020) on the target database catalog 830.

The MDM 825 determines at 1025 if the query to implement the delta on the target database succeeded or failed. If the query failed, the MDM returns (at 1030) a failure message to the MDI 820, and the process 1000 ends. If the query succeeds, then the MDM commits (at 1035) the transaction that was previously initiated (at 1020).

The MDM 825 then determines at 1040 whether the commit succeeded or failed. If the commit failed, then the MDM determines (at 1045) whether the maximum number of retrials has been reached or not. If not, then the MDM 825 returns to 1035 to attempt to commit the transaction. If the maximum number of retrials has been reached, then the MDM aborts the transaction (at 1050) and returns (at 1030) a failure to the MDI 820. The process 1000 then ends.

If the MDM determines (at 1040) that the commit succeeded, then it returns (at 1055) a success message to the MDI. The process 1000 then ends.

As discussed above, in some embodiments the location of the MDStore is in the target database. The database virtualization system maintains the MDStore regardless of its location, whether stored in the target database or in an alternative location. One advantage of keeping the MDStore in the target database is that the existing backup and restore functionality of the target database can be used for backing up and restoring the emulated properties as well. If the MDStore is located in an alternative location, then additional support must be enabled to synchronize the backup and restore operations of the target database with MDStore to ensure data consistency.

In some embodiments, the MDStore is a set of tables, each table containing all the emulated properties for a corresponding database object. In other embodiments, the MDStore is a single table that contains the emulated properties for all objects, such as a key-value store. An example of a single-table MDStore is illustrated in FIG. 11. In this example, each row corresponds to a single emulated property for a single database object (e.g., a table or a view). The first two columns 1105-1110 identify the database object and its associated schema. The third column 1115 specifies whether the property applies to a specific column or specifies "null" if the property is not applicable to any column. The next two columns 1120-1125 form a key-value pair for the specific property being emulated and the actual value associated with that property. In some embodiments, multiple key-value pairs or rows may be associated with a single property. Finally, there are additional columns 1130 for various metadata such as object owner, hash value of the property value for security, date last modified, etc.

In the example MDStore of FIG. 11, the first three rows are examples of static emulation of properties. Static emulation is the emulation of database object properties supported by the source database such as case sensitivity, set tables, default values, or certain data types (e.g., period data or byte type) which are not supported by the target database. In some embodiments, the database virtualization system (DVS) receives a query from a client. The query references an object in a source database, the object having two sets of properties. The DVS generates a full set of properties by retrieving one set of properties from the target database and retrieving the other set of properties from a metadata storage. Based on the full, combined set of properties, the DVS generates a new query for execution on the target database.

In some embodiments, static emulation of properties describes scenarios where only a single pass through the Query Interpreter and Query Translator is necessary for metadata lookup, in order to create a single XTRA representation that can fully represent the original query.

The first row 1135 of FIG. 11 is an example of a column that has a default value. In a table for a log of sales transactions ("SALES"), there may be a column ("TimeOfSale") with a timestamp for when the transaction occurred. During an INSERT to the table, if the timestamp is not specified, then the default value should be the current timestamp. If the target database does not support default values, then the desired default value (i.e., the current timestamp) is retrieved from the MDStore and used to prepare the query. In some embodiments, one of the associated static emulator modules 605 (e.g., a module devoted to default value interpretation) of the Binder 505 only needs to in-line the expression for evaluating the default value into the translated query. The actual value of the current timestamp would then be evaluated by the target database itself.

Figure 12:
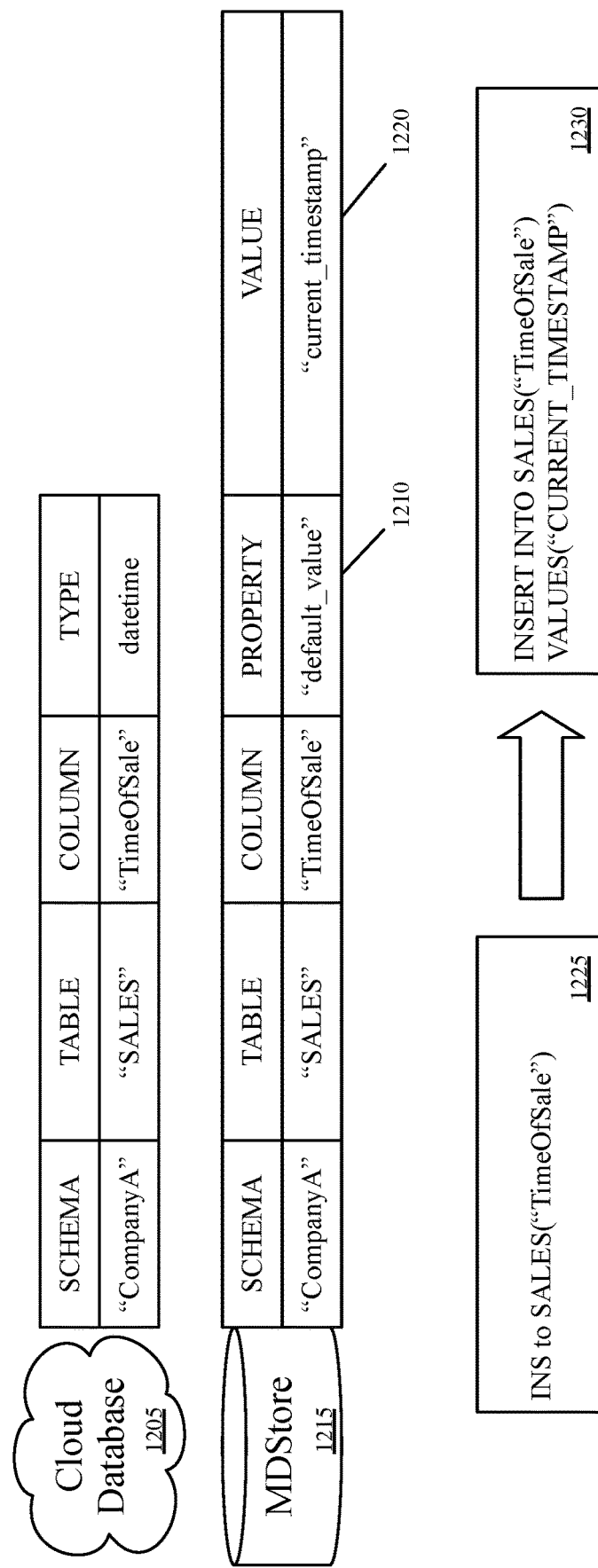
FIG. 12 conceptually illustrates an example of static emulation of default values.

The given example 1135 of static emulation of default values is further conceptually illustrated in FIG. 12. The column TimeOfSale is part of the SALES table and has a number of properties. Some of its properties, such as the data type, are stored in the target database (in some embodiments, in the target database catalog 1205). All such column properties (i.e., metadata) that are supported by the target database can be delegated to the target database. However, some of the column properties for TimeOfSale are not supported by the target database, namely the default value property 1210. Such properties are therefore stored in MDStore 1215. In this example, the default property for the TimeOfSale column is the current timestamp. This is represented in some embodiments as a system variable or function call in the syntax of the source database. For example, if the source database is Teradata, the Teradata function "current timestamp" is stored as the value 1220 associated with the default value property 1210.

When a query 1225 is received that references the column, the query is expressed in the syntax of the source database. This syntax implicitly exploits the default value property, e.g., there is no value specified for the INS statement, since there is no need to specify a default value. If the query were executed on the source database (e.g. Teradata), then the that database would automatically populate the correct value. However, since the target database (e.g., Azure) does not support default values, the query is syntactically incomplete.

In some embodiments, the Parser parses the query 1225, recognizes that the syntax INS from Teradata is equivalent to an INSERT statement, and provides an AST of the query to the Binder. The Binder then consults the property derivation framework, recognizes that the query contains an INSERT statement without all the required values, and issues a metadata lookup call to the MDI to retrieve the missing metadata from MDStore. When the metadata from the target database is combined with the metadata from MDStore, the query can be fully translated for execution on the target database.

In this example, the query is translated to a new query 1230 expressed in the syntax of Azure, and the INSERT statement is provided the missing values, in this case a function call in Azure syntax ("CURRENT_TIMESTAMP") to obtain the current timestamp. The function call for the timestamp is in-lined directly into the query, so the actual evaluation of the time stamp will be done by the target database. The generated query 1230 is then executed on the target database and the correct value of the current timestamp will be inserted into the TimeOfSale column.

The second row 1140 of FIG. 11 is an example of a case-sensitive column. The table of user information ("USERS"), has some columns (such as user name or email) that are not case sensitive and some columns ("password") that are case-sensitive. A query that seeks to compare a user-supplied password to the password stored in the database needs to know whether the stored data is case sensitive or not, in order to evaluate whether or not there is a match. During a SELECT to the table, the user-supplied password will be used to search the stored data for a match. If the target database does not support case sensitivity, then the SELECT statement may return incorrect results (e.g., false-positive matches). By retrieving the property of case sensitivity, the correct behavior for the SELECT query and/or the query results can be enforced, in some embodiments by a Binder static emulator module 605 devoted to evaluating case sensitivity.

Mismatched data types are illustrated in the third row 1145 of FIG. 11. If the source database supports a custom date type ("period") which is not a single date but a date range with a start and a stop date, a target database that doesn't support the same data type will have no way to represent that type in regular date or character fields. If the table is a payroll table ("PAYROLL") for a certain pay period ("payroll21"), then the period may correspond to a pay cycle. The actual data for the pay period may be stored as two separate columns in the target database corresponding to the start and end dates of the period. Alternatively, the data may be stored as a character string containing both dates. Regardless of how the data is stored, the definition and instructions for parsing that data into the period format is stored in MDStore. That definition is parsed in some embodiments by a static emulator module 605 in the Binder for correctly reconstructing the period data type from the stored values.

In some embodiments, the client application expects period data to appear in a particular binary format. The period data could be a representation of the beginning time stamp followed by a representation of the timestamp of the end of the period. That binary representation may not be identical to what the stored string data looks like. The source string data must be retrieved, then reformatted so that the binary representation of the data the client application eventually receives is still compatible with the period representation.

Furthermore, there may be database operations that depend on the period representation in some embodiments. For example, a period intersects with another period or is joined from another period. These kinds of operations have some meaning with periods because a period is basically two timestamps, so it can intersect with another period, but these operations cannot be applied to non-period string or character data. If queries are received that use these constructs, the queries need to be translated in a way that fits how the data is captured by the target database system. As an example, if one operation is how to evaluate whether a period is overlapping with another period, it must be translated into an operation that will retrieve the two endpoints, then determine if there is overlapping or not. Similar operations must be likewise translated, such as period overlap, period intersection, period disjoint, etc.

Another example of mismatched data types in some embodiments is when the source database supports a byte data type that stores a piece of data in one byte. The target database may not have this data type but has a data type that stores data in two bytes (e.g. a small integer). In this case, whenever the client application attempts to create a table or use a data type that stores data in one byte, the DVS must map it into a different type into the target system on the backend. When a query is trying to retrieve data from that particular column/field, it must be extracted and packed back into one byte, so the client application still gets the representation that it expects.

In the MDStore example of FIG. 11, the fourth row 1150 is an example of dynamic emulation of properties. Dynamic emulation is the emulation of user-defined objects from the source database such as macros and stored procedures which are undefined on the target database. In some embodiments, the DVS receives a query referencing a set of operations (e.g., a macro or stored procedure) to perform on the source database. The DVS retrieves a definition for the set of operations from a metadata storage, and based on the retrieved definition, generates multiple queries. The generated queries successively execute on the target database and include at least one query that is generated based on a result of executing a previously generated query.

In some embodiments, dynamic emulation of properties is required when the query references a complex operation that contains execution logic. Unlike with static emulation, which is a one-to-one translation of a query to another query, dynamic emulation of the complex operation results in multiple generated queries that are executed in a certain sequence on the target database and whose results are used to modify subsequent generated queries.

Examples of these types of complex operations include macros or stored procedures. These are user-defined entities that combine control logic as well as database instruction statements. Examples of control logic (also referred to as control flow) include loops, conditionals, Booleans, input arguments, and other programming constructs. These entities encode business logic in some embodiments, in the form of an object that can be created once and used many times. In some embodiments, applications can be built upon these macros and stored procedures. Generally, the target database will understand the database instruction statements (e.g., DDL, DML, etc.), but may not be able to process the control logic. Therefore, a hybrid execution of the stored procedure or macro is required, partly on the target database and partly within the database virtualization system.

In some embodiments, the control flow might execute until a given variable value turns out to be true or false, or it might execute for a fixed number of iterations. In other words, the DVS uses the definition of the stored procedure/macro stored in MDStore to unwrap or flatten the body of the stored procedure/macro into smaller pieces (i.e., statements) which can be completely processed and executed by the target system. The DVS controls the flow of the execution to know how many times a particular statement should execute. Each of the individual statements is executed on the target database and the result from its execution is used to update the context in which subsequent statements are generated and executed.

In some embodiments, when all the generated queries have been executed and their responses processed and combined, a single response to the original source query can be generated and returned to the client, which is expecting a single result from the stored procedure or macro call instead of separate ones from the smaller "unrolled" pieces. This reply will include values of variables stored in the Varscope during the execution of the generated queries. In some embodiments, these values from Varscope used to generate the reply were generated and/or updated in the execution of the final generated query. In other embodiments, some values from Varscope were generated/updated from the execution of earlier generated queries prior to the final generated query. The values in Varscope that were generated from execution of the final generated query are combined with or include values generated from execution of earlier generated queries.

Figure 13:
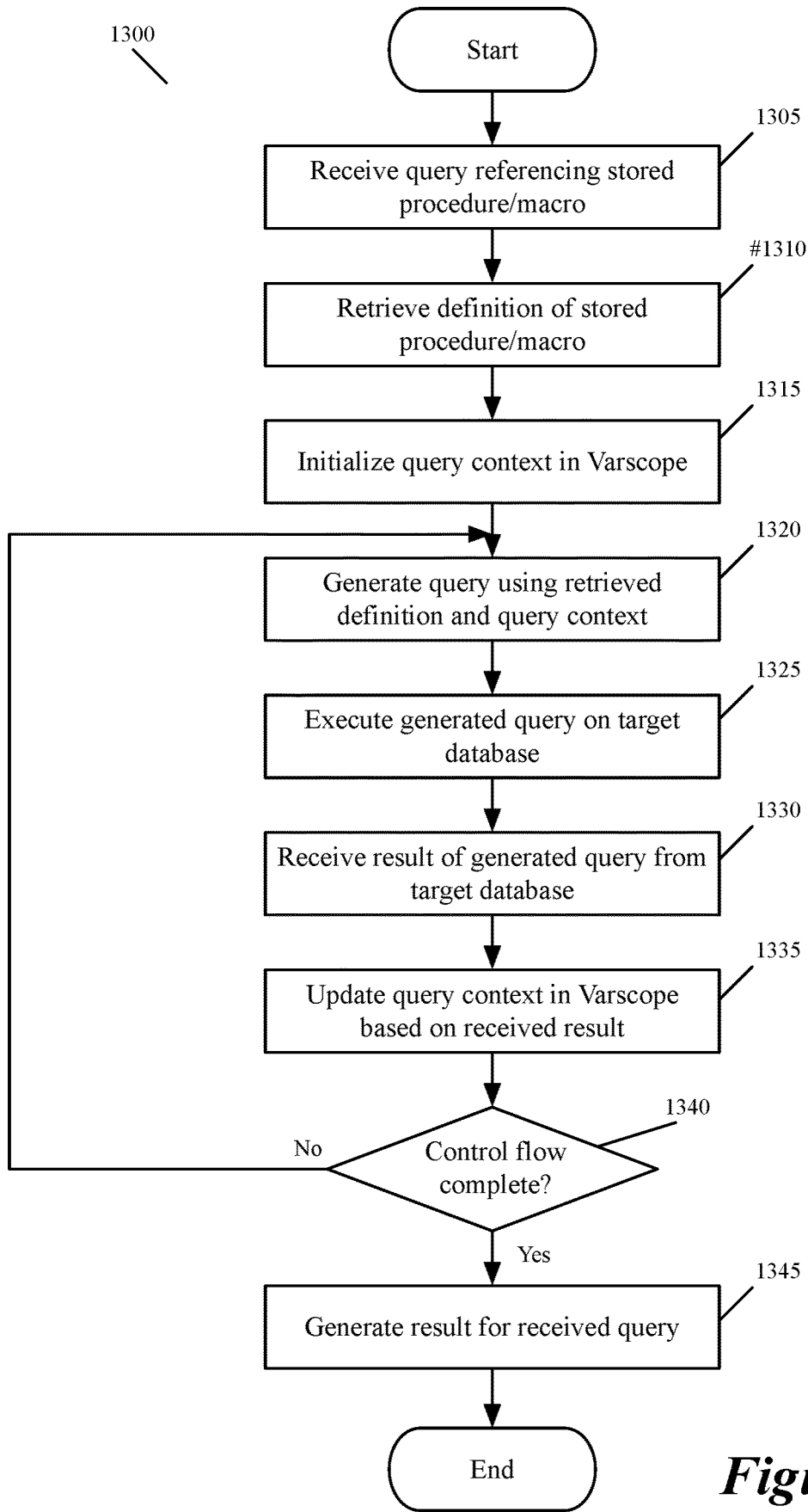
FIG. 13 illustrates a process performed in some embodiments for dynamic emulation of a stored procedure.

FIG. 13 illustrates a process 1300 of some embodiments for dynamic emulation of a stored procedure. In some embodiments, operations of this process are performed by the Binder and Transformer. Some of the operations in process 1300 may occur in a different sequence than the one illustrated or may be omitted.

The process begins at 1305 by receiving a query that references a complex operation, such as a stored procedure or macro. The process 1300 retrieves at 1310 the definition of the complex operation from MDStore, identifying it as requiring dynamic emulation. Based on the retrieved definition, the process 1300 initializes at 1315 the Varscope with values of control variables and objects that are referenced in the definition. These values are associated with the user state of variables, control flow, and exception handling, for example. Taken together, these values are referred to in some embodiments as the query context.

The process 1300 uses the retrieved definition of the complex operation and the current query context to generate at 1320 a query for the target database. In some embodiments, the generated query is in the XTRA representation, which is then translated to the syntax of the target database by the Query Translator. The generated query is then executed (at 1325) on the target database system. The generated query will contain statements (DDL, DML, etc.) that are fully understood by the target database system.

After executing the generated query, the process 1300 receives at 1330 a result from the target database. Based on the received result, the process 1300 updates (at 1335) the query context. In some embodiments this update includes iterating or modifying control variables such as a loop variable. The process 1300 also determines at 1340 whether the control flow of the complex operation is complete. If not, then the process returns to 1320 in order to generate a new query based on the updated query context in Varscope and the definition retrieved from MDStore.

If the process 1300 determines that the control flow of the complex operation is complete, the process generates at 1345 a final result based on the final query context and the previously received results, for returning to the client application. The process 1300 then ends.

Figure 14:
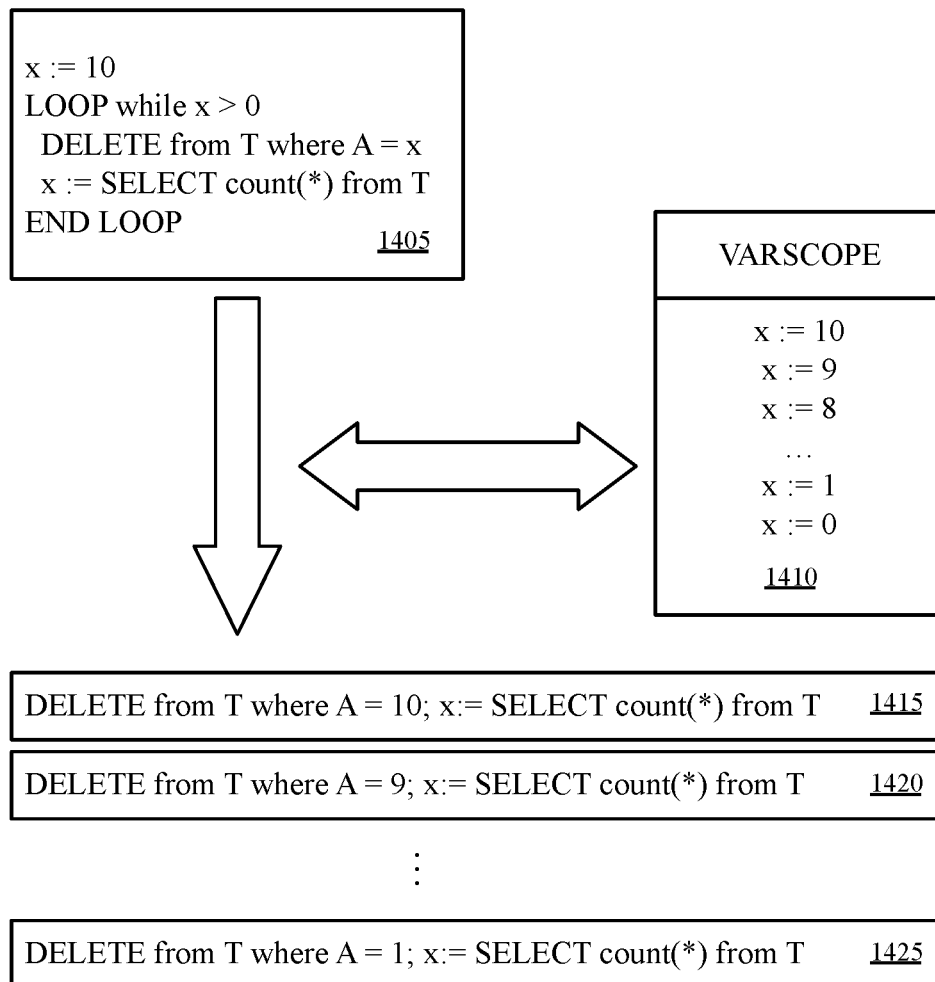
FIG. 14 conceptually illustrates an example of a process for emulating macros and stored procedures.

FIG. 14 conceptually illustrates an example of the process 1300 for the stored procedure presented in the sample MDStore of FIG. 11. The definition 1405 of the sample stored procedure has a loop that executes while a looping variable "x" is nonzero, and a DELETE statement inside the loop, which depends on the looping variable. The looping variable "x" depends on the size of the table T from which rows are being deleted, and therefore changes during each iteration of the loop. For simplicity's sake, consider T to only have ten rows, and the value in column A ranges from 1 to 10.

The initial value of the looping variable "x" is defined as 10 in the definition 1405, so the value of "x" is initialized to 10 in the Varscope 1410. Based on the initial value, the definition 1405 retrieved from MDStore is evaluated to generate the first query 1415 for execution on the target database system. This generated query 1415 deletes a row from the table T (the row where the column A has the value 10), and then updates the value of the looping variable as the count of the remaining rows of T, which is now reduced by one due to the DELETE. In other words, the SELECT returns a value of 9, not 10.

Upon receiving the result of the generated query 1415 executed on the target database, the VARSCOPE is updated with the new value of the looping variable, namely "x" is now updated to 9 instead of 10. Since this value is still nonzero, the definition 1405 of the stored procedure requires that the loop continue. Therefore, a new query 1420 is generated from the stored definition 1405 and the updated value of the looping variable "x" from the Varscope. The second generated query 1420 deletes a row from the table T (the row where the column A has the value 9), and then updates the value of the looping variable as the count of the remaining rows of T, which is now reduced by one due to the DELETE. In other words, the SELECT returns a value of 8, not 9.

In this manner, the results of each generated query are used to update the Varscope and generate a new query until generated query 1425, which is generated when the looping variable value is updated to a value of 1. The generated query 1425 deletes a row from the table T (the row where the column A has the value 1), and then updates the value of the looping variable as the count of the remaining rows of T, which is now reduced by one due to the DELETE. In other words, the SELECT returns a value of zero, not 1. Upon receiving the result of the generated query 1425 executed on the target database, the VARSCOPE is updated with the new value of the looping variable, namely "x" is now updated to zero instead of 1. Since this value is not greater than zero, the definition 1405 of the stored procedure requires that the loop ends. This completes the emulation of the stored procedure 1405.

In the example MDStore of FIG. 11, the fifth row 1155 is an example of emulating an updateable view. In some embodiments, a view is a collection or aggregation of data from other database objects (e.g., tables, columns, and even other views) that are defined by a query (e.g., a CREATE statement in SQL) to the database. A view is in some embodiments a virtual database object that does not store data itself. Views may be referenced in a query in some embodiments just like any other database object.

When supported by the source database, emulation of updateable views is necessary since in most target database systems, views are read-only queries that cannot modify the base tables. Views can be selectively restricted to certain users, such as a manager who has access to salary data from an employee table. However, some databases do allow modifications to a view, which propagates to the base tables in the database. In order to emulate this functionality on a target database that does not support updateable views, the updateable view must be translated to a query for the target database that modifies the data.

In some embodiments, the database virtualization system (DVS) receives a query for modifying data tuples presented in an updateable view defined for the source database. The DVS retrieves a definition of the updateable view from a metadata storage, the definition including a reference to a set of objects associated with the data tuples in the source database. Based on the retrieved definition, The DVS generates a second query referencing objects associated with the data tuples in the target database. The DVS then executes the generated query on the target database to modify the data tuples in the second database.

Figure 15:
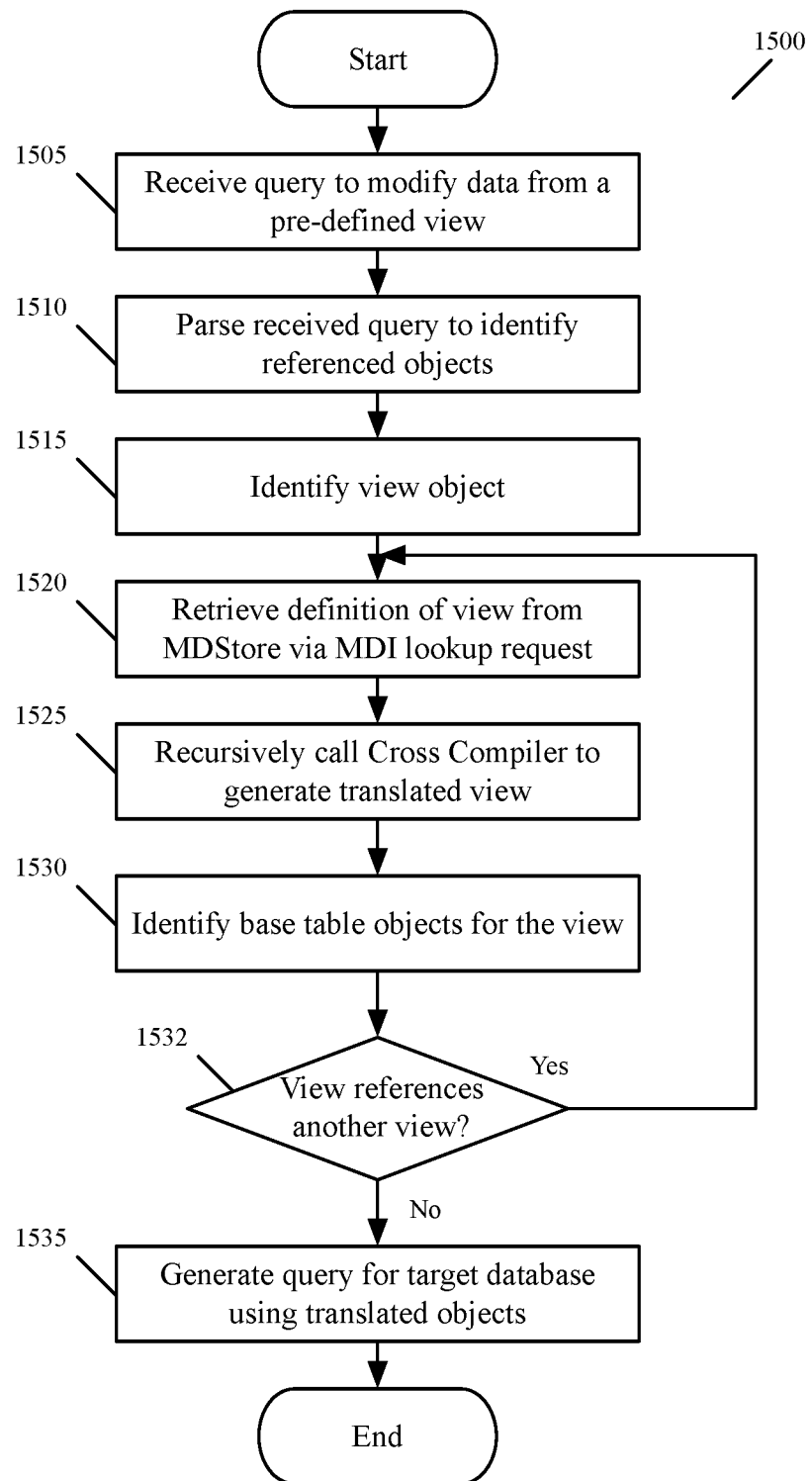
FIG. 15 conceptually illustrates a process for emulating updateable views.
Figure 16:
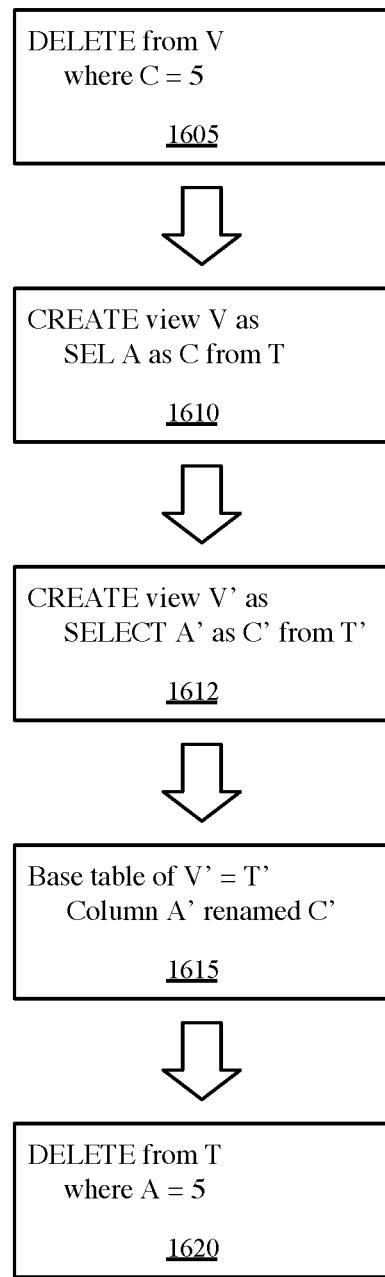
FIG. 16 conceptually illustrates an example of emulation of an updateable view.

FIG. 15 illustrates a process 1500 that is performed by the Cross Compiler to emulate an updateable view in some embodiments. FIG. 16 illustrates the different stages of the process 1500 for the updateable view example of FIG. 11.

The process 1500 begins by receiving (at 1505) and parsing (at 1510) a query for modifying data tuples from a pre-defined updateable view. The query references the view object and seeks to perform a data modification operation (e.g., DEL, INS, etc.), in the syntax of the source database (e.g., Teradata). For example, the query 1605 specifies to perform a DEL operation for any row of a view V where the value in column C is equal to 5.

The process 1500 then determines (at 1515) that the object that is being referenced in the query is a view object. This determination is made in some embodiments by consulting the property derivation framework. Since the query 1605 specifies a non-read-only DML, operation (in this case, DEL) on the view, which is not allowed on the target system, the process must determine the base tables for the view and generate a query to perform the DML operation directly on the target database.

In some embodiments, the process 1500 performs a metadata lookup request at 1520 to retrieve the definition of the view from MDStore. In some embodiments, the view definition is stored in MDStore as free text of a query that was written to execute on the source database. For example, the view definition 1610 specifies a query for the source database that defines the view V (using a CREATE statement in SQL) by selecting column A from table T and renaming it to C. This view definition 1610 is expressed in the syntax of the source database (e.g., Teradata).

Based on the view definition, the process 1500 then recursively calls the Cross Compiler at 1525 to translate the view definition query to a new query that can execute on the target database in order to define the same view. The translated view definition query references objects in the target database, which correspond to the migrated objects from the source database. For example, the translated view definition 1612 specifies a query for the target database that defines the view V' by selecting column A' from table T' and renaming it to C'. This translated view definition 1612 is expressed in the syntax of the target database (e.g., Azure).

In this example, the prime mark on the object name denotes that the object of the same name is in the target database rather than the source database. In some embodiments, the objects have the same name in both databases after migration. Therefore, the view definition can be used on the target database without any modification or mapping required between the object names of the source database and their corresponding objects in the target database. In other embodiments, the object may have a different name after migration. In these cases, the Cross Compiler must use a mapping between the object names in the source database and the corresponding object names in the target database, to identify the correct objects to reference in the translated view definition 1612.

At 1530 the process 1500 uses the translated view definition to identify the base objects referenced in the view definition. This mapping between referenced objects and base objects may be performed by an Updateable View Translator module 620 of the Binder in some embodiments. In some embodiments, the module 620 employs the property derivation framework to identify the base tables/objects. For example, the mapping 1615 specifies that the reference to the view V' should be replaced with a reference to the table T', and the reference to the column C' should be replaced with a reference to the column A'. In other words, T' is the base table for V' and A' is the base object for C'.

In the example above, there is a one-to-one correspondence between objects in the source database and objects in the target database, since these objects have been migrated. In some embodiments, there is always a one-to-one correspondence, for example when the target database supports all the required features of the source database. However, in other embodiments, where there is no such one-to-one correspondence between source and target database objects, then emulation is required during the mapping of the view definition 1612, using the techniques discussed elsewhere in this document.

In some embodiments, one of the referenced objects in the view definition may be another view. Views may contain references to other views, and combine (e.g., join) information from multiple views. If the process identifies (at 1532) one of the base objects in the view definition as a view, then the process 1500 returns to 1520 to retrieve the definition of the referenced view and again recursively call the Cross Compiler. View definitions are thus in-lined until there are no more views referenced, and the only references are to base objects.

After determining (at 1532) that all identified objects are base objects, the process 1500 then generates at 1535 a new query for the target database, by translating the received query and modifying it, using the mapping, to operate directly on the base database objects. The generated query implements the desired modification to the data tuples in the base tables of the target database to fulfill the updateable view request. The process 1500 then ends. For example, the generated query 1620 specifies to perform a DELETE operation for any row of the base table T' where the value in column A' is equal to 5. The generated query is expressed in the syntax of the target database (e.g., Azure).

In some embodiments, the scope of the updateable view can be changed. For example, in FIG. 17, a query 1705 is received to update a view EMPL_V in order to change the last name of an employee named Peter. As can be seen from the definition 1710 of the view EMPL_V, the view is limited to employees in the Sales department. The view also includes an option for the scope. Depending on the value of the option, the query 1705 will either modify the last name of all Peters in the Sales department or will update the last name of all employees named Peter, in all departments.

In the example MDStore of FIG. 11, the sixth row 1160 is an example of catalog emulation. Each database system has a unique catalog that contains the system information and properties of the database objects. Descriptions of tables, functions, stored procedures, and even hardware configurations are all defined in the catalog, and every database system exposes interfaces to query that catalog. In some embodiments these interfaces include APIs as well as graphical user interfaces (GUIs). Whenever a client is constructing a query, it needs to first issue a query against the system catalog, to understand the objects that are available and can be referenced in a query.

Catalog emulation is also necessary since any query referencing the database catalog of the source database would fail, because that catalog does not exist on the target database system. In some embodiments, the database virtualization system (DVS) receives from a client a query that requests a presentation of a system object of the source database. From a metadata storage, the DVS identifies a query for the target database that references system objects of the target database and generates the requested presentation of the system object of the source database. The DVS then replies to the client with the generated presentation.

The database constructs in the target database in some embodiments do not need to be target-database specific. Even though object names differ between database systems, most databases support a set of standard tables defined in the SQL standard, referred to as the information schema. The information schema defines a standard set of views that every system can implement. When a client query is received that references the source database catalog, the database virtualization system uses metadata from MDStore to emulate the source database catalog using the information schema views of the target database catalog. This is necessary because the source database catalog does not exist on the target database system and therefore cannot be directly queried.

In the example MDStore of FIG. 11, the source database system is Teradata, which defines a single DBC database for its system catalog, of which various views (i.e., system objects) exist such as DBC.Tables for tables, DBC.Databases for databases, and DBC.Columns for columns. These are potentially overlapping views, for example DBC.Tables may potentially contain information not just about tables but also anything related to tables, such as column and view information as well. In order to emulate the full functionality of DBC.Tables, in this example the MDStore defines a mapping for the catalog table DBC.Tables in Teradata as a sub-query referencing information schema tables, namely information_schema.tables and information_schema.routines. A more detailed example of the mapping 1805 for DBC.Tables that is stored in MDStore is illustrated in FIG. 18.

In some embodiments, a query from a client application that references a system object like DBC.Tables will expect results in a tabular format, since DBC.Tables is a view with columns such as database name, table name, type of object, etc. The data required to produce that result is in the information schema tables, joined in the right way to produce the result in the same expected tabular format. As described above and illustrated in FIG. 18, the metadata stored in MDStore is a sub-query that joins columns from the information schema tables to create the Teradata view. The query received from the client application therefore triggers a metadata lookup from the Binder to retrieve the sub-query definition from MDStore in order to translate the query to something that the target database can understand, referencing the information schema tables instead of the Teradata-specific tables.

In some embodiments, where the target database does not have relational views, the information schema is not supported. One such example of a target database that does not support the information schema is Apache Impala, which has commands that must be executed sequentially instead of queries that can be joined. As a result, the actual data must be retrieved from the target database (e.g., the data must be materialized) using the equivalent commands (as defined in MDStore) and then reformatted by the database virtualization system into the format expected by the client. The reformatted data is then returned to the client as a response to the query on the system objects.

Figure 19:
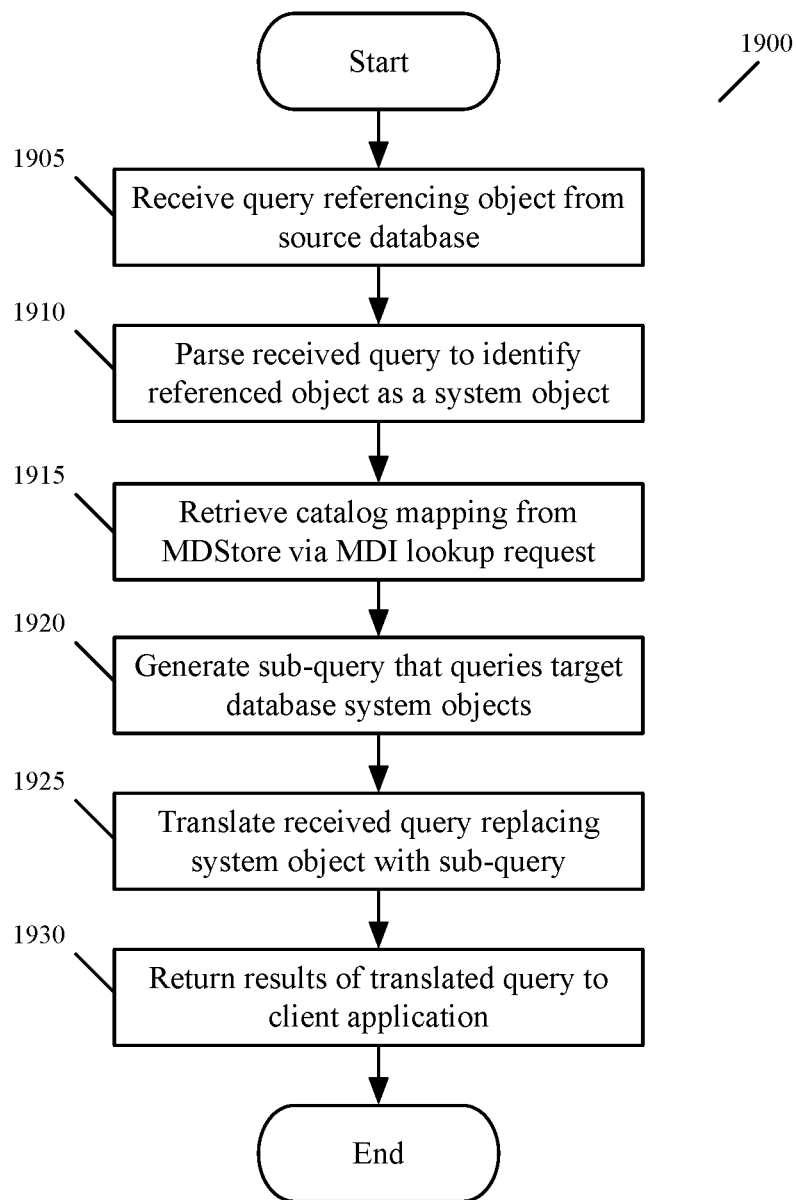
FIG. 19 conceptually illustrates a process for catalog emulation.

FIG. 19 conceptually illustrates a process 1900 performed by the Cross Compiler in some embodiments for catalog emulation. The process 1900 receives at 1905 a query referencing a source database object. The query is parsed at 1910 to identify the referenced object as a system object from the source database catalog. The process 1900 then performs a metadata lookup on the system object at 1915 in order to retrieve the catalog mapping of the system object to the information schema (e.g., the mapping 1800). After retrieving the mapping, the process 1900 generates at 1920 a sub-query referencing the system tables of the target database. The received query is then translated at 1925 to a new query for the target database, replacing references to the source database system object with the generated sub-query referencing the target database system objects. In some embodiments this translation is performed by the Catalog Emulator module 615 of the Binder. After the translated query is executed on the target database, the results of the translated query are then returned at 1930 to the requesting client application. The process at 1900 then ends.

One use case for catalog emulation is a system objects browser application, e.g. an SQL explorer tool in Teradata or a script. The tool permits the user to navigate what tables are in the database, what columns that table has, etc., using a click-through interface. The top-level objects (tables, views) are listed in hierarchies, which can be expanded to drill down to columns and properties of each object. For example, if the tool is a graphical tool, then each object may have an icon next to it for expanding its nested objects (e.g., "+" to expand and "−" to collapse). Each of these actions generates a new query that tries to request the information from the source (Teradata) catalog, and which must be separately interpreted and translated to execute on the target database (e.g., Azure).

As noted above, MDStore is used by the database virtualization system for augmentation of the functionality of the target database to emulate the functionality of the source database. However, MDStore can also be used in some embodiments for optimizing queries for the target database, based on various characteristics of the target database that differ from those of the source database. The database virtualization system maintains information pertaining to query optimization as metadata associated with the supported target database systems. In some embodiments this metadata may be hard-coded as part of target database-specific routines. However, in other embodiments the metadata for query optimization is stored in MDStore and maintained by the database virtualization system. Storing this metadata in MDStore allows flexibility in adding support for more target systems and different versions.

In some embodiments, query optimizations are implemented as transformations that are performed by either the Binder or the Transformer. Examples of these transformations include moving transactional boundaries and changing the granularity of operations, by query batching and query unbatching.

Query batching is required in some embodiments when the target database imposes a higher cost on certain transactions than the source database. In some embodiments, the database virtualization system (DVS) individually receives multiple queries from a database client where each query is written for a source database. The DVS performs an automated process to analyze properties of the target database to determine that the queries can be replaced by a single query to the target database. Based on that determination, the DVS combines the queries to generate a single query for the target database and forwards the generated single query to the target database for execution.

As an example, atomic inserts cost 5 msec on Teradata and 500 msec on Azure. Therefore, by combining multiple INSERT statements into a single database query or transaction, severe performance degradation from executing the same query on Azure can be avoided. FIG. 20 illustrates an example of query batching. In 2005, a set of five atomic INSERT statements are specified, which would require a total of 25 msec to execute on a source Teradata database. Note that there are also two SELECT statements interspersed between the INSERT statements. If these queries were to be executed as-is on Azure, then they would require 2500 msec (2.5 seconds), since each INSERT incurs its own transaction overhead. Instead, the same queries are batched as shown in 2010. Now, all the INSERT statements are combined into a single transaction, which excludes the SELECT statements. The resulting time for execution of the batched queries requires 500 msec, since there is only a single transaction, not five. In the simplified example, the SELECT statements are on different tables than the INSERT statements, so the values they return do not depend on the order in which they are executed. However, in the event that there was a dependence, a more sophisticated batching order would be necessary to take the dependencies into account.

In order to correctly batch different statements together, the database virtualization system must in some embodiments keep track of transactional boundaries. Doing so requires maintaining the context of the client session, which in some embodiments is handled by the Session Manager. Certain database statements can change that context, such as timeouts (for atomic statements), commits (for transactional statements), or a ceiling on the maximum number of operations that can be performed.

Since the client application has issued multiple queries to the source database, it is often expecting multiple replies, for example in some embodiments where queries are transactions. However, in batching the query, a single query is generated for execution on the target database. In some embodiments, the client does not expect multiple replies corresponding to the multiple queries. Therefore, the single reply from the target database does not need to be modified or broken into multiple corresponding queries before being converted to the client's expected syntax. In other embodiments, the reply from the target database must be broken into multiple replies. In that case, the single reply from the target database can be either converted to the client's expected syntax before being broken into multiple replies, or first broken into multiple replies each individually converted to the client's expected syntax.

Figure 21:
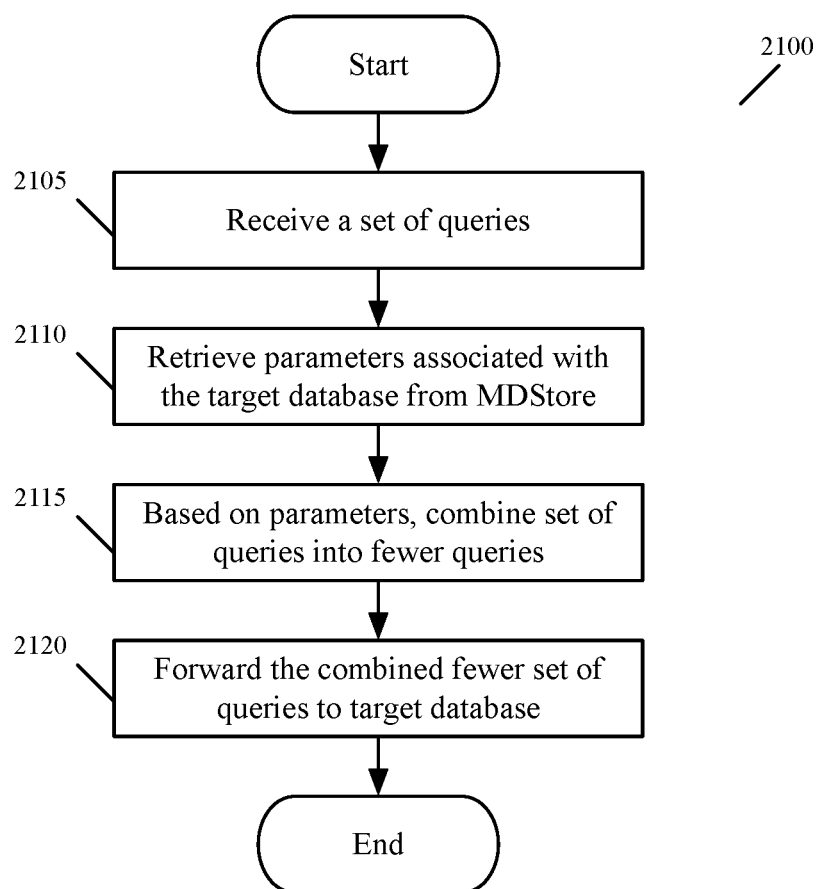
FIG. 21 conceptually illustrates a process performed in some embodiments by the Cross Compiler for query batching.

A process 2100 performed in some embodiments by the Cross Compiler for query batching is conceptually illustrated in FIG. 21. Query batching is performed by a Query Batcher module 625 of either the Binder or the Transformer in some embodiments. The process begins by receiving (at 2105) a set of queries written for the source database, referencing specific database operations (e.g. SQL statements such as INSERT, DELETE, etc.).

The process 2100 retrieves (at 2110) relevant parameters associated with the characteristics of the target database from the MD Store. In some embodiments, these parameters include transaction limits, timeout values, batching thresholds, and how to perform a commit operation. The Binder or the Transformer initiates the metadata lookup in some embodiments when a matching transformation is triggered.

At 2115, the Query Batcher 625 combines them into a set of fewer queries (i.e., batches) using the retrieved metadata as a guide. In some embodiments, the Query Batcher 625 also communicates directly with the Session Manager in order to ensure that the context of the client session is preserved during batching. After the queries have been batched, the process 2100 then forwards (at 2120) the fewer batched operations to the target database for execution. The process 2100 then ends.

Query unbatching is used in some embodiments when the target database has stricter requirements on the types of database statements that can be grouped together in a single transaction. The database virtualization system (DVS) takes these characteristics and requirements into account by reordering queries to regroup the database statements. In some embodiments, the database virtualization system (DVS) receives a particular query from a database client, where the query is written for a source database. The DVS performs an automated process to analyze properties of the target database to determine that the received query should be replaced by multiple queries to the target database. Based on the determination, the DVS generates multiple queries for the second database and individually forwards each generated query to the target database for execution.

As an example, the target database may impose constraints on grouping data definition statements and data manipulation statements in a single transaction. Data definition language (DDL) statements are statements that operate on the structure of the database, e.g. CREATE, DROP, ALTER, etc. Data manipulation language (DML) statements are statements that operate on data stored in the database, e.g. INSERT, UPDATE, DELETE, etc. In some databases, mixing these types of statements is not allowed since it has higher potential of user error. For example, if a user specifies that a database table is dropped (a DDL operation) before an attempt is made to insert data (a DML operation) to that same table, this would create an error, which would require issuing a rollback request to revert the database. By segregating these types of statements, such user errors are prevented on some database types. As a result, for migrating a query from a less strict source database type to a target database that is stricter about mixing DDL with DML, the query statements must be reordered and separated into multiple different queries for execution.

An example of query unbatching is illustrated in FIG. 22. A transaction for a Teradata database is illustrated in 2205 that contains a DDL statement (the CREATE statement) and multiple DML statements (SEL, UPDATE). Even though this query does not have any syntax errors that would necessitate a rollback, this query would not be allowed on Azure since that system is stricter about combining DDL and DML in a transaction than Teradata. 2210 illustrates the same query translated for Azure and unbatched into three transactions, the first and third of which contain the DML, and the second of which contains the DDL. In this simplified example, the order of the statements remains the same, but it may be necessary to modify the ordering to account for dependencies of statements on each other.

With query unbatching, it is also important to keep track of the session context and ensure that the unbatching does not alter the results of executing the query. The database virtualization system must ensure correctness after unbatching the original query. Furthermore, the database virtualization system must be able to recognize if an error has occurred in order to rollback a particular query statement (e.g. by using a REVERT statement in some embodiments). The database virtualization system may in some embodiments execute overlapping transactions on the target database in order to unbatch the single query.

Since the client application has issued a single query to the source database, it is often expecting a single reply, for example in some embodiments where the query is a transaction. However, in unbatching the query, multiple queries are generated for execution on the target database. In some embodiments, these multiple queries generate multiple replies, which must be combined back into the single reply expected by the client.

In some embodiments, the multiple replies from the target database must be collected into a single reply prior to converting to the client's expected syntax. In other embodiments, each reply is converted separately by the Cross Compiler and the replies are then combined. In some embodiments, the database virtualization system uses a session parameter or identifier corresponding to the client session to associate the generated queries for execution on the target database, so that their corresponding replies are also associated with the same client session.

An additional scenario for query unbatching in some embodiments is for statistics. Certain databases have a facility for automatically detecting when the indexes or database statistics need to be rebuilt. A query optimizer the makes a decision on how it puts the query plan together primarily using the table statistics and its knowledge of the schema. For example, when joining two small tables, it does not really matter whether A is joined to B or vice versa. However, if table B grows by a million rows, all of a sudden, the table join and order in which those joins need to be executed in a statement becomes very important from a performance standpoint. Determining the optimal order requires the statistics to be up to date. As a result, a single query could be unbatched into multiple queries by interspersing statistics operations (e.g. CREATE STATS or UPDATE STATS) based on the number of affected rows by the query. The DVS can determine the need for interspersing these statements based on characteristics of the target database that are stored in MDStore, such as how many statements in a particular session modify the table to the extent that statistics are no longer relevant or have become skewed.

Figure 23:
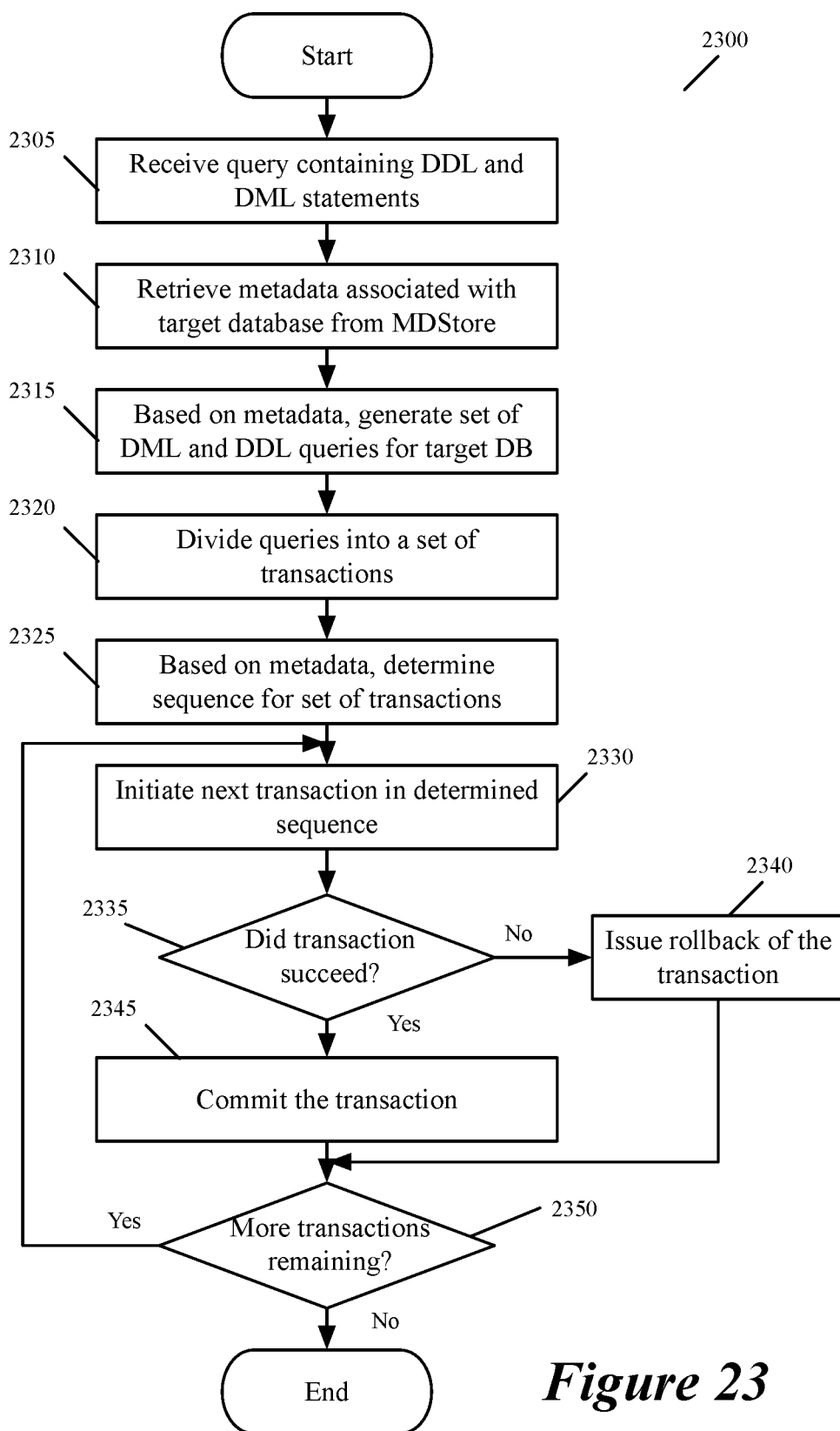
FIG. 23 conceptually illustrates a process performed in some embodiments by the Cross Compiler for query unbatching.

FIG. 23 conceptually illustrates a process 2300 performed in some embodiments by the Cross Compiler for query unbatching. Query unbatching is performed by a Query Unbatcher module 630 of either the Binder or the Transformer in some embodiments.

The process begins at 2305 by receiving a query that contains a mix of both DDL and DML statements. The process 2300 retrieves (at 2310) relevant parameters associated with the characteristics of the target database from the MD Store. In some embodiments, these parameters include transaction limits and the target database's rules for combining DDL and DML statements. The Binder or the Transformer initiates the metadata lookup in some embodiments when a matching transformation is triggered.

The process 2300 uses the retrieved metadata (at 2315) to break apart the original query into a set of equivalent queries for the target database. In some embodiments, this unbatching is performed by the Query Unbatcher module 630. The statements will be organized according to the rules of the target database for mixing different statement types. For example, if the target database requires DML and DDL to be completely separated, then each query in the set of equivalent queries will have either DML or DDL statements, but not both.

The generated queries are then grouped into a number of transactions at 2320. The number of transactions into which the queries must be divided amongst are determined using the retrieved metadata. The sequence of the transactions for the set of transactions is also determined at 2325. In some embodiments, these determinations are performed by the Query Translator, from which the Transformer component can reference the Query Unbatching module.

After determining the sequence, the process 2300 initiates at 2330 each transaction on the target database in that sequence. After each transaction is initiated, the process 2300 determines at 2335 whether the transaction succeeded or not. If the transaction failed, then a rollback of that transaction is issued at 2340. If the transaction succeeded, then a commit transaction is issued at 2345.

After the transaction has been either rolled back or committed, the process 2300 then determines (at 2350) if there are any more transactions remaining in the sequence. If there are, then the process returns to 2330 to initiate the next transaction. If there are no more remaining transactions, then the process 2300 ends.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 24:
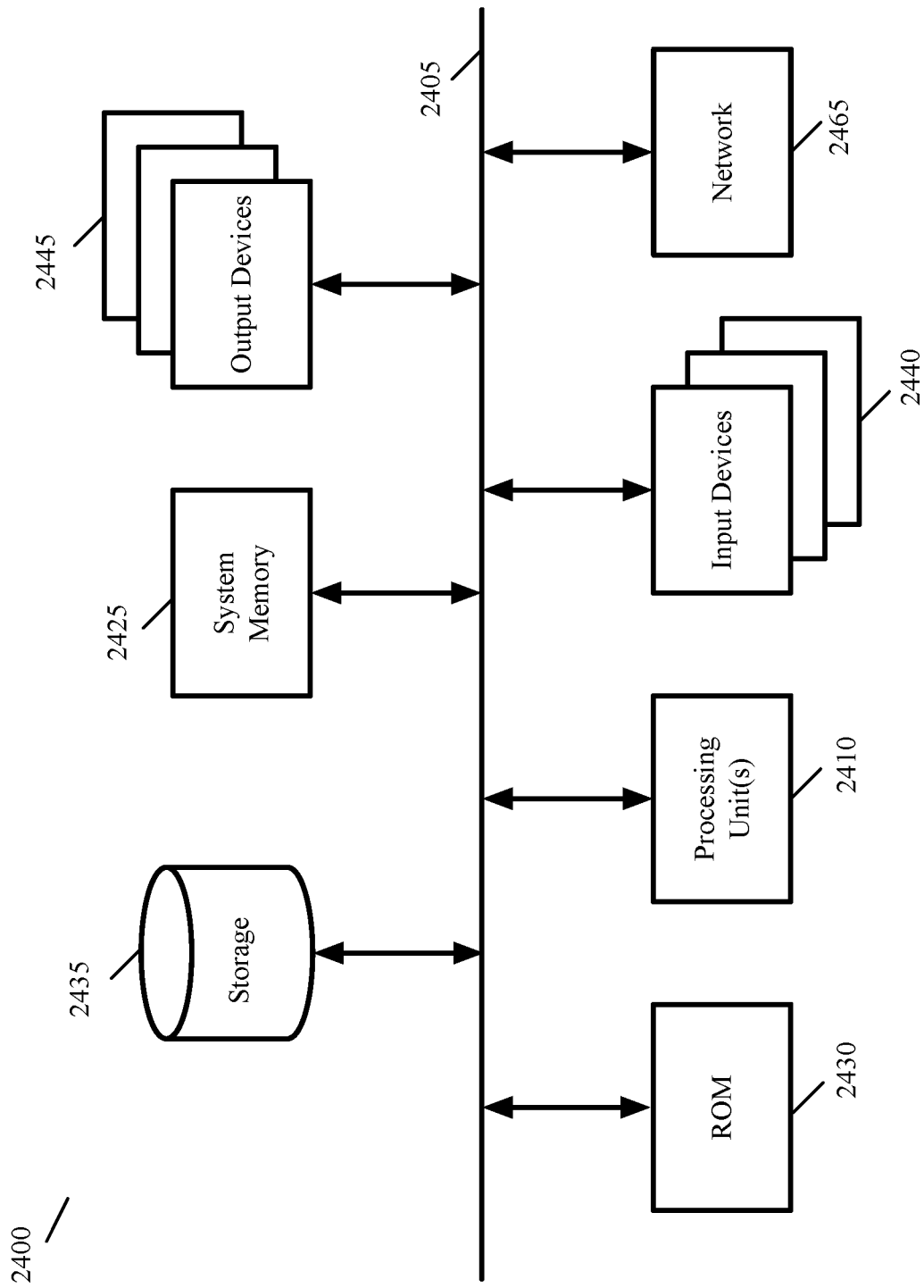
FIG. 24 conceptually illustrates an electronic system with which some embodiments of the invention are implemented.

FIG. 24 conceptually illustrates an electronic system 2400 with which some embodiments of the invention are implemented. The electronic system 2400 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2400 includes a bus 2405, processing unit(s) 2410, a system memory 2425, a read-only memory 2430, a permanent storage device 2435, input devices 2440, and output devices 2445.

The bus 2405 collectively represents all system, peripheral, and chipset buses that communicatively connect the numerous internal devices of the electronic system 2400. For instance, the bus 2405 communicatively connects the processing unit(s) 2410 with the read-only memory 2430, the system memory 2425, and the permanent storage device 2435.

From these various memory units, the processing unit(s) 2410 retrieve instructions to execute and data to process in order to execute the processes of the invention. The processing unit(s) may be a single processor or a multi-core processor in different embodiments.

The read-only-memory (ROM) 2430 stores static data and instructions that are needed by the processing unit(s) 2410 and other modules of the electronic system. The permanent storage device 2435, on the other hand, is a read-and-write memory device. This device is a non-volatile memory unit that stores instructions and data even when the electronic system 2400 is off. Some embodiments of the invention use a mass-storage device (such as a magnetic or optical disk and its corresponding disk drive) as the permanent storage device 2435.

Other embodiments use a removable storage device (such as a floppy disk, flash drive, etc.) as the permanent storage device. Like the permanent storage device 2435, the system memory 2425 is a read-and-write memory device. However, unlike storage device 2435, the system memory is a volatile read-and-write memory, such as random-access memory. The system memory stores some of the instructions and data that the processor needs at runtime. In some embodiments, the invention's processes are stored in the system memory 2425, the permanent storage device 2435, and/or the read-only memory 2430. From these various memory units, the processing unit(s) 2410 retrieve instructions to execute and data to process in order to execute the processes of some embodiments.

The bus 2405 also connects to the input and output devices 2440 and 2445. The input devices enable the user to communicate information and select commands to the electronic system. The input devices 2440 include alphanumeric keyboards and pointing devices (also called "cursor control devices"). The output devices 2445 display images generated by the electronic system. The output devices include printers and display devices, such as cathode ray tubes (CRT) or liquid crystal displays (LCD). Some embodiments include devices such as a touchscreen that function as both input and output devices.

Finally, bus 2405 also couples electronic system 2400 to a network 2465 through a network adapter (not shown). In this manner, the computer can be a part of a network of computers (such as a local area network ("LAN"), a wide area network ("WAN"), or an Intranet, or a network of networks, such as the Internet. Any or all components of electronic system 2400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, at least one figure conceptually illustrates a process. The specific operations of this process may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For an updateable view that is defined for a first database, a method of processing an update to data tuples in a second database, the update specified by reference to the updateable view, the method comprising:
   from a client, receiving a first query for modifying a particular data tuple presented in the updateable view;
   from a metadata storage, retrieving a definition of the updateable view, said definition comprising a reference to a first set of one or more objects associated with the particular data tuple in the first database;
   based on the retrieved definition, generating a second query referencing a second set of one or more objects associated with the particular data tuple in the second database; and
   executing the generated second query on the second database to modify the particular data tuple in the second database.

2. The method of claim 1, wherein prior to receiving the first query, a plurality of data tuples was migrated from the first database to the second database, said plurality of data tuples comprising the particular data tuple, wherein the first database is a first database type and the second database is a second, different database type.

3. The method of claim 2, wherein the first query is in a first query format associated with the first database type, wherein the generated second query is in a second query format associated with the second database type, wherein generating the second query comprises:
   performing a first query interpretation operation to translate the first query from the first query format to the second query format; and
   performing a second query interpretation operation on the retrieved definition to generate the second query based on the translated first query.

4. The method of claim 3, wherein the retrieved definition is a first definition referencing the first set of database objects, wherein performing the second query interpretation operation comprises:
   generating a second definition of the updateable view, said second definition referencing the second set of database objects;
   using the second definition of the updateable view to modify the translated first query in the second query format; and
   generating the second query in the second query format based on the modified translated first query.

5. The method of claim 4, wherein the updateable view is a first view, wherein the first definition of the first view comprises a reference to a second view, wherein:
   the method further comprises retrieving a third definition of the second view, said third definition comprising a reference to the first set of database objects;
   performing the second query interpretation operation further comprises performing a third query interpretation operation on the retrieved third definition of the second view to generate a fourth definition of the second view referencing the second set of database objects; and
   modifying the translated first query is further based on the fourth definition of the second view referencing the second set of database objects.

6. The method of claim 3, wherein performing the first query interpretation operation comprises:
   translating the first query from the first query format into a third query in a third query format that is not associated with any database type; and
   translating the third query from the third query format into the second query format associated with the second database type.

7. The method of claim 1, wherein the first query comprises at least one data manipulation language (DML) statement.

8. The method of claim 7, wherein the DML statement comprises at least one of a select, insert, update, and delete statement.

9. The method of claim 1, wherein the definition of the updateable view comprises a query referencing the first set of objects.

10. The method of claim 2, wherein the first and second database types are each a different one of Teradata, Oracle, PostgreSQL, Amazon Redshift, Microsoft Azure SQL Data Warehouse, PostgreSQL, Pivotal Greenplum, Google BigQuery, Apache Impala, and Snowflake.

11. The method of claim 1, wherein the first and second sets of objects comprise a least one of a table, a column, and a view.

12. For an updateable view that is defined for a first database, a non-transitory machine readable medium storing a program which when executed by at least one processing unit, processes an update to data tuples in a second database, the update specified by reference to the updateable view, the program comprising sets of instructions for:

from a client, receiving a first query for modifying a particular data tuple presented in the updateable view;

from a metadata storage, retrieving a definition of the updateable view, said definition comprising a reference to a first set of one or more objects associated with the particular data tuple in the first database;

based on the retrieved definition, generating a second query referencing a second set of one or more objects associated with the particular data tuple in the second database; and executing the generated second query on the second database to modify the particular data tuple in the second database.

13. The non-transitory machine readable medium of claim 12, wherein the first and second sets of objects comprise a least one of a table, a column, and a view.

14. The non-transitory machine readable medium of claim 12, wherein prior to receiving the first query, a plurality of data tuples was migrated from the first database to the second database, said plurality of data tuples comprising the particular data tuple, wherein the first database is a first database type and the second database is a second, different database type.

15. The non-transitory machine readable medium of claim 14, wherein the first query is in a first query format associated with the first database type, wherein the generated second query is in a second query format associated with the second database type, wherein the set of instructions for generating the second query comprises sets of instructions for:

performing a first query interpretation operation to translate the first query from the first query format to the second query format; and performing a second query interpretation operation on the retrieved definition to generate the second query based on the translated first query.

16. The non-transitory machine readable medium of claim 15, wherein the retrieved definition is a first definition referencing the first set of database objects, wherein the set of instructions for performing the second query interpretation operation comprises sets of instructions for:

generating a second definition of the updateable view, said second definition referencing the second set of database objects;

using the second definition of the updateable view to modify the translated first query in the second query format; and generating the second query in the second query format based on the modified translated first query.

17. The non-transitory machine readable medium of claim 16, wherein the updateable view is a first view, wherein the first definition of the first view comprises a reference to a second view, wherein:

the program further comprises a set of instructions for retrieving a third definition of the second view, said third definition comprising a reference to the first set of database objects;

the set of instructions for performing the second query interpretation operation further comprises a set of instructions for performing a third query interpretation operation on the retrieved third definition of the second view to generate a fourth definition of the second view referencing the second set of database objects; and modifying the translated first query is further based on the fourth definition of the second view referencing the second set of database objects.

18. The non-transitory machine readable medium of claim 15, wherein the set of instructions for performing the first query interpretation operation comprises sets of instructions for:

translating the first query from the first query format into a third query in a third query format that is not associated with any database type; and translating the third query from the third query format into the second query format associated with the second database type.

19. The non-transitory machine readable medium of claim 12, wherein the first query comprises at least one data manipulation language (DML) statement that includes at least one of a select, insert, update, and delete statement.

20. The non-transitory machine readable medium of claim 12, wherein the definition of the updateable view comprises a query referencing the first set of objects.

* * * * *